(12) United States Patent
Dimitrov et al.

(10) Patent No.: US 6,264,883 B1
(45) Date of Patent: Jul. 24, 2001

(54) PLANT FOR THE PRODUCTION OF METAL MELTS

(75) Inventors: Stefan Dimitrov; Norbert Ramaseder, both of Linz; Wilfried Pirklbauer, Niederneukirchen; Yoyou Zhai, Linz; Johannes Steins, Gallneukirchen; Ernst Fritz, Linz; Johannes Müller, Neumarkt, all of (AT)

(73) Assignee: Voest-Alpine Industrieanlagenbau GmbH, Linz (AT)

( * ) Notice: Subject to any disclaimer, the term of this patent is extended or adjusted under 35 U.S.C. 154(b) by 0 days.

(21) Appl. No.: 09/258,755

(22) Filed: Feb. 26, 1999

Related U.S. Application Data

(63) Continuation of application No. PCT/AT98/00160, filed on Jun. 26, 1998.

(30) Foreign Application Priority Data

Jun. 27, 1997 (AT) .................................................. 1109/97

(51) Int. Cl.$^7$ ...................................................... C21C 5/32

(52) U.S. Cl. .......................... 266/227; 266/230; 266/236; 266/906

(58) Field of Search .................................... 266/165, 236, 266/45, 900, 227, 230; 75/414, 10.61, 10.66, 10.65, 560, 573, 584

(56) References Cited

U.S. PATENT DOCUMENTS

| | | | |
|---|---|---|---|
| 4,657,878 | * | 4/1987 | Clishem et al. ..................... 501/115 |
| 5,259,863 | * | 11/1993 | Schneider et al. ..................... 75/414 |
| 5,641,336 | * | 6/1997 | Roth ..................................... 75/414 |

FOREIGN PATENT DOCUMENTS

| | | |
|---|---|---|
| 295566 | 1/1972 | (AT) . |
| 898759 | 12/1953 | (DE) . |
| 1433431 | 5/1969 | (DE) . |

(List continued on next page.)

OTHER PUBLICATIONS

J.A. Vallomy, et al., No Month "Success of Consteel™ Process in USA Leads to Start Up of 120 MT/HR Unit in Japan", 1992 Electric Furnace Conference Proceedings, pp. 309–313.

W. Reichelt, et al., "Contiarc—A New Scrap Melting Technology", MPT International Feb. 1996, pp. 56–60.

*Primary Examiner*—Roy King
*Assistant Examiner*—Tima McGuthry-Banks
(74) *Attorney, Agent, or Firm*—Ostrolenk, Faber, Gerb & Soffen, LLP

(57) ABSTRACT

To be able to produce metal melts using any metal carriers incurring in metallurgical practice as the charging materials, namely in the most diverse quantitative compositions, a plant for producing metal melts is provided with the following characteristic features:

- an electric arc furnace vessel (1) provided with one charging opening (11, 21) for a metal melt and/or scrap and/or direct reduced metal, in particular direct reduced iron, and/or ore and at least one electrode (16) and one slag tapping means (22),
- an oxygen-blowing converter vessel (3) provided with one melt tapping means (41),
- wherein the oxygen-blowing converter vessel (3) and the electric arc furnace vessel (1) form a unit which is connected via an overflow weir (34) and which is rigidly mounted on the foundation and,
- wherein the bath surface related specifically to the bath volume is smaller in the oxygen-blowing converter vessel (3) than in the electric arc furnace vessel (1) and
- the oxygen-blowing converter vessel (3) shares a common reaction space with the electric arc furnace vessel (1), which space is arranged above the bath level of these vessels. (FIG. 1).

33 Claims, 5 Drawing Sheets

FOREIGN PATENT DOCUMENTS

| | | |
|---|---|---|
| 3609923 | 9/1987 | (DE) . |
| 0487494 | 5/1992 | (EP) . |
| 0548041 | 6/1993 | (EP) . |
| 0843020 | 5/1998 | (EP) . |
| 57161020 * | 10/1982 | (JP) . |
| 96/32505 | 10/1996 | (WO) . |

* cited by examiner

PLANT FOR THE PRODUCTION OF METAL MELTS

CROSS-REFERENCE TO RELATED APPLICATIONS

This is a continuation application of International Application PCT/AT98/00160, with an International filing date of Jun. 26, 1998.

BACKGROUND OF THE INVENTION

1. Field of the Invention

The invention relates to a plant for the production of metal melts, in particular iron melts, such as steel melts, crude steel melts or pig iron melts, and a process for the production of these melts.

2. Description of the Related Art

The present standard aggregate used for the production of electric steel is an a.c. or d.c. electric arc furnace. The iron carriers charged, which are comprised of

- 60 to 100% steel scrap, directly reduced iron-sponge iron in various quantitative ratios and sometimes also iron carbide (at present, up to about 10 to 20% of the total charge), and
- 0 to 40% liquid and/or solid pig iron are melted by aid of one or several electric arcs using oxygen lance(s)—if desired, burner(s), nozzles and/or inert gas flushing—and under the addition of carbon carriers and slag formers. After this, the steel bath during a flat bath period (5 to 10 min) in an electric arc furnace is brought to the temperature and composition desired for tapping and is killed in the ladle during tapping. Energy and material consumption as well as plant productivity vary greatly as a function of the respective charging ratios and melting practice.

Due to the world-wide introduction of secondary metallurgical processes as well as a series of developments on the constructive, electric and technological sectors, electric arc furnace melting has changed within the past few years into a process both flexible and efficient in terms of charging substances and steel quality produced, more and more exhibiting substantial advantages over converter metallurgy and competing the same successfully. With new process developments, important reductions of the melting time and the specific electric energy consumption and hence further reduction of the specific operating and investment costs of electric steel production in electric arc furnaces have been attained primarily by applying

- integrated scrap preheating and/or hot charging of sponge iron/hot-briquetted directly reduced iron
- continuous addition of a major portion of the charging substances (iron carriers, carbon carriers, fluxes, etc.) while minimizing the power-off time for carrying out charging operations
- optimum foamed slag operation and
- cheaper primary energies (coal, natural gas, etc.) as a substitute for electric energy, including an improved offgas-afterburning operation and more efficient utilization of heat.

However, with the known processes for the production of electric steel by means of electric arc furnaces used as melting aggregates, the potential advantages of the above-mentioned process developments have been utilized to a limited extent only. Moreover, it has not been feasible so far—despite an increasing demand—to process to liquid steel high portions of liquid pig iron and/or other carbon-rich iron carriers (sponge iron, iron carbide etc.) as well as problem scrap (used cars) of about 30 to 70% charged into electric arc furnaces, at a high productivity and energy utilization and, with car scrap, also without inadmissible loads on the environment. The commercial application of a technology and plant based on electric arc furnace technology and highly efficient under such conditions from an economic point of view is still wanting.

The above-mentioned limitations with conventional electric arc furnaces are due exclusively to the configuration of the furnaces, which does not enable a quasi-stationary continuous process course. The operations of charging, melting, refining, heating and tapping take place on one site, by necessity more or less offset in time and with interruption(s) of the charge and current supply—at least before and after tapping—in order to obtain the desired composition and temperature (homogeneity and overheating in respect of the liquidus temperature) of the crude steel. The present process course in an electric arc furnace is discontinuous and hence limited in its performance. In this respect, the following is noted:

1. With already reached tap-to-tap times of $\leq 55$ min with conventional electric arc furnaces and $\leq 35$ min for electric arc furnaces with shaft, respectively, for tap weights of 70 to 150 tons, the possibility of further reducing the power-off phases is strongly limited. The same holds for the power-on phases—since under such conditions the limits for an economic energy input per ton of charge and time unit—and hence for the overall melting time have almost been reached.
2. In continuous charging as well as in refining and heating in the flat bath operation, which will take a substantially longer time with high charging portions of sponge iron and, in particular, of liquid pig iron and iron carbide (about 6.1% C), thus also increasing the heat loss, the actual transformer output, as a rule, is not completely utilized by electric arc furnaces.

From AT-B-295.566 a process for the continuous production of steel by melting prereduced ore and subsequently refining the melt of semi-steel to steel in an electric arc melting furnace comprising a melting hearth to which a refining zone and at least one slag depositing chamber are connected is known, in which prereduced iron ore is introduced into the electric arc zone of the melting hearth in a lumpy or granular form, the metal is continuously agitated and set in a circulatory movement within the hearth and the metal is refined to steel while flowing through a refining zone by blowing in an oxygen-containing gas, whereas slag is caused to stream opposite to the metal at least along part of the length of the refining zone. The slag calms down in a slag depositing chamber without intensive mixing of the bath and then is tapped from the slag depositing chamber.

In that known process, plant scrap and liquid pig iron may be charged, yet each in very limited amounts only. Discharging of the offgases takes place directly in the refining zone, i.e., not via the electric arc melting furnace. The refining zone is constructed as a channel-type reactor, resulting in a high specific surface area with high heat losses. Refining is carried out with a C-concentration gradient along the refining zone of the channel-type reactor without a concentration balancing tank, and therefore the C content is difficult to adjust or control. Consequently, that known process is applicable to a limited extent only, in the first place serving to produce crude steel from prereduced ore.

From DE-C 3 609 923 a process and an arrangement for continuously melting scrap to crude steel is known. In that process, which primarily is limited to scrap melting (no mention being made of charging liquid pig iron and/or sponge iron), the heat of the furnace gases is utilized for heating the scrap. The scrap is preheated in a shaft centrally placed on the hearth-type furnace and is introduced centrally into the hearth-type furnace, thereby forming a scrap column supported on the bottom of the electric arc furnace under formation of a conical pile and capable of reaching up as far as to the scrap charging opening provided in the upper part of the scrap preheating shaft. Pivotable electrodes (preferably four electrodes) are symmetrically arranged about the scrap column in the electric arc furnace and assist in melting the scrap. The angle of inclination between the central axis of an electrode and a vertical line during scrap melting amounts to more than 20° for each of the electrodes. Thereby, the hearth-type furnace is exposed to a great thermal load, since the electric arcs are burning between the centrally introduced scrap column and the walls and lid of the hearth-type furnace. On the one hand, this causes an increased wear of the refractory lining and hence elevated material and time costs for doing repairs. In addition, a large portion of the input energy is imparted by radiation to the furnace walls and the furnace lid and thereby gets lost. Moreover, possible bridging within the scrap column—above the melt caverns melted into it by the electrodes—may cause precipitation of the scrap column (or parts thereof), which might lead to a break of the electrodes and hence interrupt the process.

From MPT International 2/1996, pages 56 to 60, the Contiarc process is known in which scrap is melted continuously, namely in an annular shaft furnace. This process serves exclusively for the melting of scrap; charging of sponge iron and/or liquid pig iron are not mentioned at all. One disadvantage associated with this method are the difficulties in adjusting the crude steel temperature immediately before starting and while performing the tapping operation, since there is a very large contact area of the scrap, which is arranged in the shape of a ring, with the liquid bath. There may also arise difficulties in respect of the balancing out of concentrations or in respect of the chemical homogeneity of the melt which is refined and tapped discontinuously with this process.

According to the Consteel® process (known from Electric Furnace Conference Proceedings 1992, pp. 309 to 313), scrap is preheated using an elongated horizontal preheating furnace and is charged to an electric furnace, namely at one side of the electric furnace. The offgas arising in the electric furnace is carried off via the elongated preheater for the scrap. However, no optimum gas utilization results with this process, since the scrap is not streamed through by the offgas but the latter only passes across the same. The elongated preheating channel for the scrap is stationarily arranged, whereas the electric furnace is mounted so as to be tiltable in order to enable a crude steel tapping operation which is discontinuous with this process. The structure as such is thus expensive, as with all pivotable furnaces. There results mechanical wear of the refractory furnace lining. Charging of the scrap is discontinuous, since the scrap is introduced on one side of the furnace only, namely is deposited in a marginal region of the furnace. As a result, the melting and mixing operations cannot be carried out in an optimum manner, and in using burners in the electric furnace to support melting of the scrap only a low efficiency would be achieved. The content of dust in the offgas is relatively large since scrap is not filtered off from the offgas.

The invention aims at avoiding these drawbacks and difficulties and has as its object to provide a plant as well as a process for producing metal melts, in particular iron melts, which basically enable the charging of any metal carriers incurring in metallurgical practice, preferably iron carriers having various physico-chemical properties, such as iron scrap, liquid and/or solid pig iron, iron carbide, sponge iron, iron ore having different degrees of prereduction, sinter, scales, metallurgical dust, dried sludges, etc., in various quantitative compositions such that, for instance, if there is a shortage of one iron carrier another one may be used instead without capacity restrictions.

To achieve this object, a plant according to the invention is provided with the following characteristic features: comprising an electric arc furnace vessel provided with at least one charging opening for a metal melt and/or scrap and/or direct reduced metal, in particular direct reduced iron, and/or ore and at least one electrode as well as at least one slag tapping means, an oxygen-blowing converter vessel provided with at least one metal tapping means, wherein the oxygen-blowing converter vessel and the electric arc furnace vessel form a unit which is connected via an overflow weir, and the bath surface related specifically to the bath volume is smaller in the oxygen-blowing converter vessel than in the electric arc furnace vessel and the oxygen-blowing converter vessel shares a common reaction space with the electric arc furnace vessel, which space is arranged above the bath level of these vessels.

The plant in accordance with the invention in addition to solving the problem defined above offers the advantage that in case of continuous tapping the refractory lining of the plant parts is subjected to no and in case of discontinuous tapping only to slight strains resulting from changes in temperature.

Due to the unit composed of the converter vessel and the electric arc furnace vessel being preferably rigidly arranged with respect to the foundation, there is no mechanical load on the vessels, in particular the refractory lining thereof, by tilting movements or by any weight shifts resulting therefrom. In addition, the refractory brick-lining inside the electric arc furnace vessel will be protected since, in that vessel, a metal melt rich in C at all times exerts a reducing effect on the slag or lowers the content of FeO in the slag, respectively. The temperature within the electric arc furnace vessel is relatively low, namely lower than 1600° C.

For an optimum refining operation in the oxygen-blowing converter vessel it is of advantage if the tapping-level of the metal bath of the oxygen-blowing converter vessel is located below the level of the metal bath of the electric arc furnace vessel, wherein the bottom of the oxygen-blowing converter vessel is advantageously arranged on a lower level than the bottom of the electric arc furnace vessel.

Preferably, the oxygen-blowing converter vessel is provided with one blowing lance for oxygen or an oxygen-containing gas mixture.

According to a preferred variant, the oxygen-blowing converter vessel is provided with bottom nozzles, preferably with oxygen-blowing bottom nozzles.

Advantageously, the electric arc furnace vessel is provided with at least one metal tapping means.

Suitably, the slag tapping means is provided on a decanting vessel which forms a unit with the electric arc furnace vessel, which decanting vessel is preferably arranged so as to be located diametrically opposite the overflow weir. Hereby it feasible to make the slag forming in the oxygen-blowing converter vessel flow into the electric arc furnace vessel in counterflow to the metal melt.

Suitably, the oxygen-blowing converter vessel and/or the electric arc furnace vessel is/are provided with a charging opening for charging metallic charging substances, ore, fluxes, alloys, carburizing agents and, further, the oxygen-blowing converter vessel is provided with afterburning nozzles and/or lances feeding an oxygen-containing gas or oxygen, preferably at least one thereof in the vicinity of the transition between the two vessels.

According to a preferred embodiment, the electric arc furnace vessel is provided with at least one preheating shaft supplying solid iron carriers which is arranged above the electric arc furnace vessel and preferably at the side thereof or annularly above the furnace vessel, thus enabling preheated scrap and/or sponge iron or other iron carriers to be charged in a simple manner and while utilizing the heat content of the offgases arising in the electric arc furnace vessel. The preheating shaft may be arranged centrally or at a de-centralized position and preferably is not provided with gas-permeable shut-off devices (fingers), i.e. the preheating shaft discharges into the electric arc furnace vessel directly and without any obstacles, with the solid iron carriers forming a column having its base on the bottom of the electric arc furnace vessel.

According to another preferred embodiment, at least one conveyor belt being preferably provided with a casing enters the preheating shaft, wherein, suitably, the casing is entered by heating means mounted in the casing and configured as afterburning means and/or burners having ducts feeding an oxygen-containing gas.

For efficient use of the supplied energy advantageously at least part of the inner surface of the preheating shaft and/or the casing and/or the lid of the electric arc furnace vessel and/or the lid of the oxygen-blowing converter vessel is lined with refractory materials.

Preferably the electric arc furnace vessel is provided with a means for feeding a metal melt, preferably pig iron.

According to an alternative variant, the electric arc furnace vessel is provided with a preheating shaft, which is arranged above the electric arc furnace vessel and via a gas-permeable, cooled shut-off device opens into the electric arc furnace vessel.

An alternative embodiment is characterized in that the preheating shaft is arranged centrally above the electric arc furnace vessel and the lid of the electric arc furnace vessel is designed to be annular so as to surround the preheating shaft and connect the same with side walls of the electric arc furnace vessel, with electrodes, preferably graphite electrodes, projecting through the lid into the interior of the electric arc furnace vessel in an oblique manner.

Suitably, there are provided nozzles and/or lances and/or burners opening into the interior of the electric arc furnace vessel and connected either to a supply means for iron carriers and/or an ore supply means and/or a supply means for coal or carbon carriers and/or a supply means for slagformers and/or a supply means supplying oxygen or an oxygen-containing gas and/or a hydrocarbon supply means and/or a supply means for an inert gas.

Advantageously, nozzles and/or lances are arranged in the oxygen-blowing converter, which are connected either to a supply means for iron-carriers and/or an ore supply means and/or a supply means for coal or carbon carriers and/or a supply means for slagformers and/or a supply means supplying oxygen or an oxygen-containing gas and/or a hydrocarbon supply means and/or a supply means for an inert gas.

Preferably, the nozzles are configured as sub-bath nozzles and/or bottom flushing bricks or the lances are arranged so as to be movable, in particular pivotable and/or displaceable in their longitudinal direction.

According to a preferred embodiment, the electric arc furnace vessel is provided with (one) roughly centrally arranged electrode(s) projecting into the vessel from above as well as optionally with a bottom electrode.

To enable a wide variety of uses of the plant, the preheating shaft is preferably configured as a unit separable from the electric arc furnace vessel and from the casing and exchangeable.

For easier handling, the lid of the electric arc furnace vessel and the lid of the oxygen-blowing converter vessel form a unit or are configured as a unit.

Suitably, there is provided at least one control and/or repair opening, preferably above the transition from the electric arc furnace vessel to the oxygen-blowing converter vessel.

To avoid major interruptions when individual plant parts are in need of repair, an advantageous embodiment is characterized in that the oxygen-blowing converter vessel is constructed as a structural unit separable from the electric arc furnace vessel and exchangeable.

Preferably, the electric arc furnace vessel is provided with a bottom downwardly inclined in the direction towards the decanting vessel and merging into a roughly horizontally located bottom part of the decanting vessel, with the lowermost point of the bottom being provided in the decanting vessel and a metal tapping means being provided at the lowermost point of the bottom of the decanting vessel.

A process for the production of metal melts, in particular steel melts, such as crude steel melts is characterized by the combination of the following process steps:

- in the electric arc furnace vessel, a pre-melt is produced and brought to a predetermined temperature level and a predetermined chemical composition,
- the pre-melt flows into the oxygen-blowing converter vessel via the overflow weir continuously and irreversibly,
- the pre-melt is continuously refined in the oxygen-blowing converter vessel, preferably to crude steel and
- the refined melt is carried off the oxygen-blowing converter vessel continuously or discontinuously,
- the slag forming in the oxygen-blowing converter vessel in counterflow flows into the electric arc furnace vessel, from which it is withdrawn.

Suitably, prefining is carried out in the electric arc furnace vessel and final refining of the metal product in the oxygen-blowing converter vessel.

Preferably, in the oxygen-blowing converter vessel a chemical composition and a temperature of the metal melt are adjusted in a continuous manner which correspond to the chemical composition and temperature of the final melt or of the end product desired for tapping.

For adjusting a high melting efficiency, if is of advantage if the offgases formed in the oxygen-blowing converter vessel are withdrawn via the electric arc furnace vessel, with $CO+H_2$-afterburning being carried out both in the oxygen-blowing converter vessel and in the electric arc furnace vessel, wherein suitably the offgases arising in the electric arc furnace vessel and the offgases flowing over into the electric arc furnace vessel from the oxygen-blowing converter vessel are employed for preheating the lumpy charge material charged into the electric arc furnace vessel.

For better utilizing the energy, the offgases employed for preheating are afterburned step-by-step during the preheating process.

Preferably, a negative pressure is maintained in the electric arc firnace vessel and in the oxygen-blowing converter vessel.

An alternative advantageous process for the production of pig iron melts is characterized by the combination of the following process steps:

to the electric arc furnace vessel, pig iron is charged in liquid form and is brought to a predetermined temperature level, Si- and P-contents are lowered during prerefining in the electric arc furnace vessel, the liquid pig iron flows continuously into the oxygen-blowing converter vessel via the overflow weir, the liquid pig iron is furthermore partially refined in a continuous manner in the oxygen-blowing converter vessel as well, the partially refined pig iron is drawn off the oxygen-blowing converter vessel discontinuously or continuously and the slag forming in the oxygen-blowing converter vessel flows in counterflow into the electric arc furnace vessel, from which it is withdrawn, wherein the partially refined (pretreated) pig iron suitably is finally refined to a liquid end product by conventional methods, without or with feeding of other iron carriers, in a converter or electric arc flrnace provided in addition to the plant.

Preferably, the metallic charge mix is formed from at least one of the following components scrap, such as steel scrap, and/or solid pig iron or cast iron, direct reduced iron in the form of pellets and/or briquettes and/or iron carbide, liquid pig iron.

For the production of alloyed steel melts or special steel melts or stainless steel melts, the metallic charge mix is formed at least from alloyed steel scrap and liquid and/or solid alloying agents and/or ferroalloys.

Preferably, the steel melt tapped from the oxygen-blowing converter vessel is subjected to further treatment as a pre-melt in a subsequent secondary metallurgical treatment including decarburization, either with or without negative pressure (vacuum). The vacuum treatment can be carried out in a VOD, RH-OB or KTB plant. The pre-melt already exhibits a C content in excess of that demanded for the quality that is to be produced.

In case the C content after treatment in the oxygen-blowing converter vessel is already as low as that desired for the final melt, the steel melt tapped from the oxygen-blowing converter vessel is subjected to further treatment as a final melt in a subsequent secondary metallurgical treatment, f.i. in a ladle furnace or a flushing unit.

In order to avoid skulls due to the slag and to be able to carry out a quantity control in respect of the slag, a liquefying or reduction treatment, respectively, of the slag is carried out in the oxygen-blowing converter vessel after predetermined process times.

BRIEF DESCRIPTION OF THE DRAWINGS

In the following, the invention will be explained in more detail by way of several exemplary embodiments schematically illustrated in the drawing, wherein.

DETAILED DESCRIPTION OF THE PREFERRED EMBODIMENTS

Figure 1:
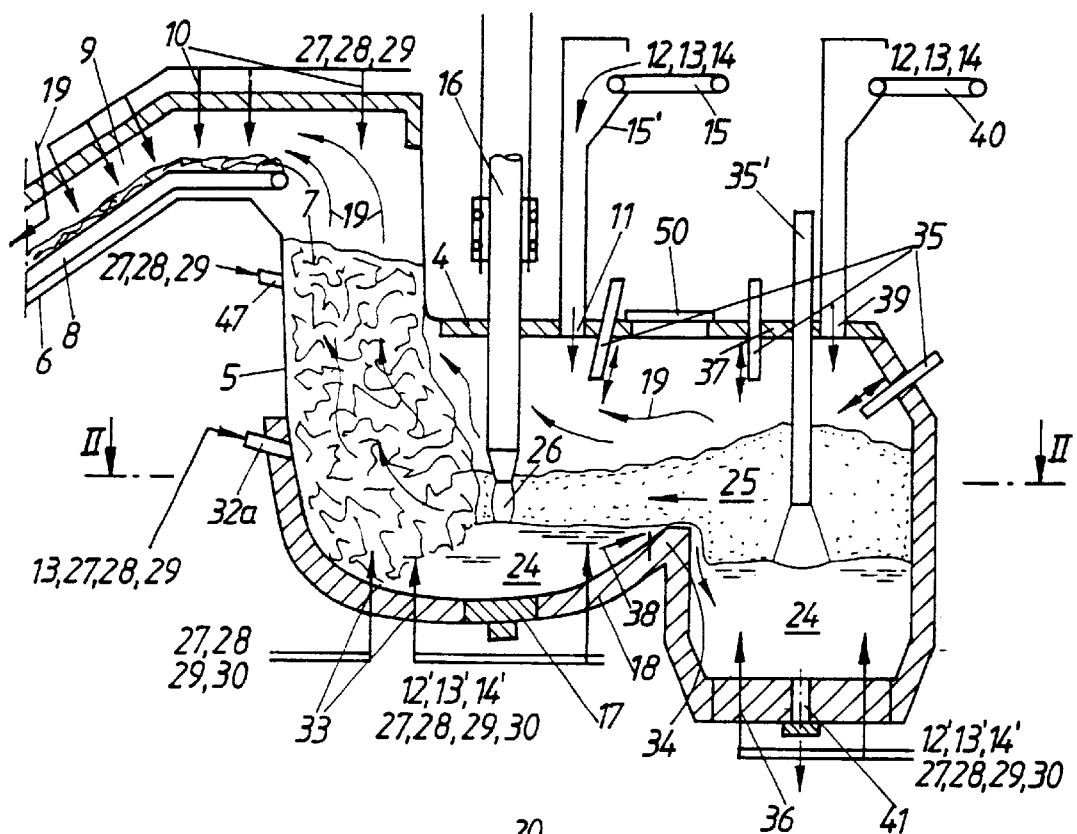
FIG. 1 is a vertical section through a plant of the invention according to a first embodiment and FIG. 2 represents a section along line II—II of FIG. 1.
Figure 2:
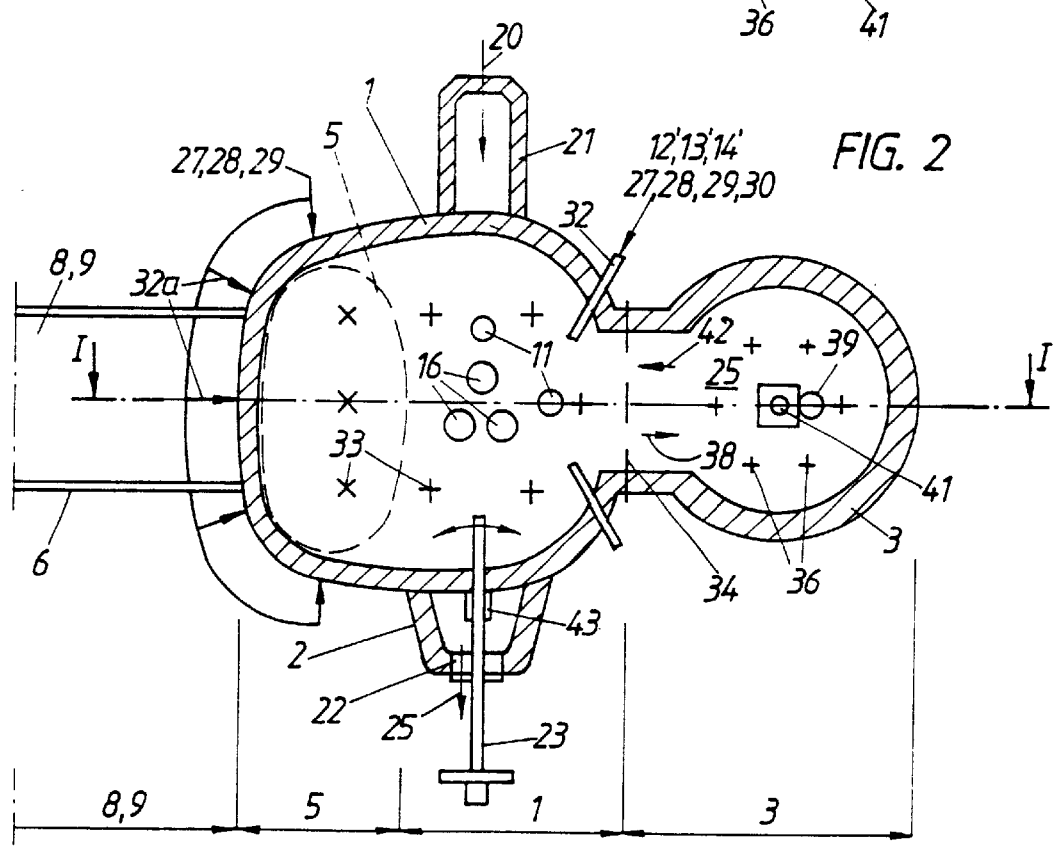

A furnace vessel 1 of a d.c. electric arc furnace is provided as an intermediate vessel between a decanting vessel 2 and a converter vessel 3 constructed as an oxygen-blowing converter, i.e., is directly connected with each of these vessels 2 and 3 so as to constitute a coherent reactor plant comprising three operating zones. The furnace vessel 1 of the electric arc furnace serves above all as a melting or melt reduction and heating zone, the converter vessel 3 predominantly as a refining and heating zone and the decanting vessel 2 as a decanting zone (settling zone). At the side of the furnace vessel 1, a preheating shaft 5 is placed on its lid 4, into which preheating shaft metallic charging substances 7—primarily steel scrap, optionally also solid pig iron and/or sponge iron—may be charged, preferably by means of a conveying belt 8. Suitably, the conveying belt 8 is encased in a casing 6, so that a heating part 9 is formed in which preheating of the charging substances 7 can be effected by means of burners and/or afterburning nozzles 10 while they are being conveyed by the belt. The heating part 9 and the preheating shaft 5 are directly connected with each other. In the lid 4 of the furnace vessel 1 there is provided at least one charging opening 11 for continuously feeding solid lumpy iron carriers 12 (direct reduced iron, fine scrap, prereduced iron ore, sinter, scales, filter dust and/or sludge briquettes, optionally fine scrap, etc.) and/or carbon carriers 13 (coal, coke, pressed parts of organic light fraction etc.) and/or slag formers 14 (lime, fluorspar, quartz sand, bauxite, etc.). Feeding is via a conveying belt 15 or conveying belts. The unit comprised of the furnace vessel 1, the converter vessel 3, the decanting vessel 2, the preheating shaft 5 and the heating part 9 constitutes the core of a first embodiment of the plant according to the invention, which is represented in FIGS. 1, 2.

The furnace vessel 1 in the case of a d.c. configuration has a single or in the case of an a.c. configuration has preferably several graphite electrodes 16 for supplying electric energy. The electrodes 16 may, if necessary, be pivotable within an angle of inclination ranging from 0 to 30° relative to the vertical in the direction towards the center of the furnace vessel 1 and up to 10° in the opposite direction towards the wall of the furnace vessel 1. The angle of inclination may be differently adjusted and/or controlled for each individual electrode 16 and during the melting operation this angle usually is about 15 to 20°. Usually, the electrodes 16 are perpendicular and are not pivotable. A bottom anode provided centrally in the bottom 18 of the furnace vessel 1 serves as a counter electrode 17 (if a direct current is employed).

The metallic charging substances 7 preheated in the preheating shaft 5 by the rising hot offgases 19 pass into the furnace vessel 1 of the plant continuously, due to the continuous melting operation conducted at a continuous supply of electricity.

The charging into the furnace vessel 1 of solid iron carriers 12 having oxidic iron portions (sponge iron, fine scrap, prereduced ore, dust briquettes, etc.) and, if necessary, of carbon carriers 13, such as coke, pressed parts of organic light fraction, etc., and slag formers 14 (lime, fluorspar, quartz sand, bauxite, etc.), is carried out continuously via charging openings 10 arranged in the lid 4, at a velocity adjusted to the discharge of the melt from the furnace vessel 1 and from the converter vessel 3.

Liquid pig iron 20 is supplied into the furnace vessel 1 continuously via a pig iron supply means 21 designed as a chute and opening into the furnace vessel 1. Via a slag door 22, which is preferably provided on the side of the furnace vessel 1 located opposite the chute 21 and through which slag may be removed as well, the process may be controlled, an additional lance manipulator 23 may be introduced and maintenance work can be can be carried out in the region of the furnace vessel 1.

As implied by the form of the plant, charging and melting within the furnace vessel 1 always takes place with a liquid sump 24. The latter renders feasible a nearly continuous quasi-stationary melting operation with foamed slag 25 and an electric arc 26 almost completely surrounded by the same. This results in high transformer outputs and thermal efficiencies and low noise emissions.

To meet the following demands processing of fine grained iron carriers 12' (e.g., iron carbide, sponge iron screening rejects, filter dusts, etc.), production and control of the foamed slag 25 acceleration of the melting procedure of the charging substances 7, 12, 13, 14 by increased energy inputs into the electric arc furnace (including afterburning of CO and $H_2$ in the offgas 19 within or above the foamed slag 25) and balancing out concentration and temperature gradients within the melt bath 24 as well as replacement of a portion of the required electric energy by cheaper primary energies, there are furthermore supplied to the furnace vessel 1 fine grained iron carriers 12' and/or fine grained coal 13' or other carbon carriers (treated organic light fraction, e.g., shredder light fraction) and/or fine grained slag formers 14' (lime, fluorspar, etc.) and/or gaseous oxygen and/or other oxidizing gases 27 ($CO_2$, $H_2O$, etc.) as well as secondary air 28 (including $O_2$-enriched air) and/or $CH_4$ or other hydrocarbons 29 and/or inert gases 30 ($N_2$, Ar)

in controlled amounts adapted to local and time demands, via one or several protected and/or non-protected nozzles and/or lances 32 (movable and/or fixedly installed lances, optionally designed as combined lances/burners 32a) at various points within the lid and/or wall regions of the electric arc furnace above and/or below the surface of the slag for top-blowing or blowing in at least one of the above-mentioned substances 12', 13', 14', 27, 28, 29, 30 and/or protected sub-bath nozzles 33 (preferably high-pressure nozzles) and/or bottom flushing bricks or sub-bath nozzles for blowing in at least one of the above-mentioned substances 12', 13', 14', 27 to 30, or flushing bricks for inert gases 30. For reasons of clarity, not all of these devices have been entered in FIG. 1.

A certain amount of liquid sump 24 having formed, the metal melt 24 formed in the furnace vessel 1 runs over a weir 34 into the converter vessel 3 and there is refined and simultaneously heated till tapping. For this purpose, the converter vessel 3 comprises at least one, preferably several nozzles, namely protected (protected by natural gas —Ar, $CO_2$ and higher hydrocarbons being usable as protective gases as well) and/or non-protected nozzles such as super-bath nozzles for afterburning and/or lances 35 (movable and/or fixedly installed lances, optionally designed as combined lances/burners) at various points in the lid and wall regions of the converter vessel 3 above and/or below the surface of the slag for top-blowing/blowing in at least one of the substances 12', 13', 14', 27 to 30 and/or protected sub-bath nozzles 36 (and/or bottom flushing bricks for blowing in at least one of the substances 12', 13', 14', 27 to 30 as well as flushing bricks for inert gases 30, and/or at least one opening 39 for the addition of lumpy iron carriers 12, carbon carriers 13 and slag formers 14—individually or in combination wherein, according to a preferred variant design of the converter vessel 3, the following is provided:

Through several lances 35 exclusively gaseous oxygen 27 is top-blown. The lances 35 are arranged roughly symmetrically in the lid 37 of the converter vessel 3, are displaceable in the vertical direction and at the same time are pivotable within an angle of inclination of about 0 to 30° relative to the vertical in or against the flow direction 38 of the metal melt 24.

Through several protected sub-bath nozzles 36 and/or flushing bricks arranged in the bottom of the converter 3 exclusively inert gas 30 ($N_2$ and/or Ar at any desired mixing ratios) is fed. The sub-bath nozzles and/or flushing bricks 36 are provided in a roughly symmetrical arrangement in the bottom of the converter vessel 3.

Into the converter vessel 3 exclusively lumpy slag formers 14 (lime, fluorspar, quartz sand, bauxite, etc.) are supplied exclusively through the lid opening 39 by means of theconveying belt 40.

Roughly above the weir 34, a control and repair opening 50 is provided.

The addition of the lumpy slag formers 14 through the lid opening 39 in the converter vessel 3—approximately above a crude steel tap opening 41—accelerates the dissolution of lime and the formation of a reactive refining slag 25 exhibiting high contents of iron oxide in the region of the converter vessel 3.

Driven by its own gravity as well as by the impetus imparted by the lances 35 and 35', the refining slag 25 moves from the converter vessel 3 towards the furnace vessel 1 in counterflow to the metal melt 24, in the direction of arrow 42, reaching metal melt 24 of constantly decreasing temperature and increasing content of accompanying elements (C, Si, Mn, P, S, etc.), thus heating and refining the same and being cooled and reduced by the same, until the slag 25 is tapped through a slag door 22 provided at the end of the decanting vessel 2.

The advantages of such a "metal/slag counterflow movement" are as follows:

1) Low heat and iron losses by the slag 25 when leaving the decanting vessel 2 through the slag door 22, because, on the one hand, the slag 25 leaves the plant on the "cold side" and, on the other hand, so-called "raining out" of metal droplets from the slag 25 takes place in the decanting vessel 2 besides the iron oxide reduction occurring primarily within the furnace vessel 1.

2) Obtainment of the desired steel grade at a substantially lower consumption of slag formers 14 and a lower specific amount of the formed slag 25, respectively, and consequently at a lower refractory wear of the plant. Since the amount of slag in the converter vessel 3 depends on level of the metal bath, high retention times or very good utilization ratios of the slag can be achieved.

The hot offgases 19 formed within the converter vessel 3 at first pass into the furnace vessel 1, mixing with the offgases forming there, before rising through the preheating shaft 5 and either (variant without heating part, FIGS. 5, 9) leaving the plant through an offgas duct 46 provided in the upper region of the preheating shaft 5 or passing into the heating part 9 (variant including a heating part, FIGS. 1, 2, 7, 8). Depending on the local heat demands in the various parts of the plant, the offgases on their way are partially afterburnt, preferably by oxygen 27, optionally by air 28 or air/oxygen mixtures, via lances 32, 35 and/or nozzles 47, nozzles 10 in the heating part. In doing so, high afterburning degrees are technically feasible at certain charging ratios and under certain conditions of process control, amounting to above 50% if exiting the furnace vessel 1 and amounting to up to 90–100° C. if exiting the preheating shaft 5 or the heating part 9. Thus, with the instant process and plant concept by far the major portion of the chemical and sensible heat of the offgases 19 is transferred to the metal bath 24 either directly within the converter vessel 3 and the furnace vessel 1 or indirectly by preheating the charging substances 7 in the heating part 9 and/or preheating shaft 5, thus being immediately utilized for the process. At the same time, the probability of uncontrollably high CO emissions is nearly eliminated. The charge in the preheating shaft 5 acts as a filter and hence affords a reduction of the dust content in the offgas.

A lower consumption of electric energy as compared to conventional electric arc furnaces without scrap preheating (by about 25 to 40%) and to discontinuously operated electric arc furnaces with integrated scrap preheating (by about 15 to 25%) results for the plant and process concept according to the invention with identical charging substances. Plant productivity is approximately doubled as compared to a conventional electric arc furnace without scrap preheating at an approximately equal size and equipment of the electric arc furnace (transformer output, lances, burners, etc.).

Plant Conception

The conception of the individual parts of the plant, such as furnace vessel 1 preheating shaft 5 heating part 9 (if provided, preferred in the case of >30% scrap in the charge mix), converter vessel 3, decanting vessel 2 number and arrangement of the charging openings 11 in the furnace vessel 1 and 39 in the converter vessel 3 is effected as a function of the charging substances to be used, in particular iron carriers 7 (shape, size, composition, temperature and state of aggregation)

the production output desired the demands in respect of steel quality the mode of operation desired for the plant (continuous or semi-continuous—with discontinuous tapping), also in respect of the desired integration with preceding and/or consecutively arranged plants (e.g., for pig iron production, direct reduction, secondary metallurgical treatment, continuous casting, etc.)

the types and prices of the energy sources available.

The main goal in conception is to carry out the partial steps of the process, namely preheating, charging, melting or melt reduction, refining, heating and tapping, within the plant at the same time, yet locally offset and hence as independent of one another as possible, in different plant parts at a controllable course of operation under respectively favorable physico-chemical, reaction-kinetic and heat-technological conditions, i.e., so to obtain an overall plant comprised of nearly perfectly (highly effectively) working sectional reactors for a concrete case of application.

The plant configuration according to the invention enables the mutually independent emptying of the plant zone comprised of furnace vessel 1 and decanting vessel 2 on the one hand (via tap opening 43) and, on the other hand, of the converter vessel 3 via tap opening 41, without having to tilt the overall plant for that purpose, inspection and minor repair work in the hot state of any of these two zones thus being feasible, if the necessity arises, at short notice while throttling the plant. According to the invention it is preferred that all of the plant parts be firmly interlocked as a unit and immovable or untiltable during operation. Due to the preferred sectional configuration of both the lower vessel and the lid 4 and 37 of the plant, individual or several parts or vessels in need of repair can be exchanged upon lateral retraction (which also applies to the preheating shaft 5). To avoid prolonged interruptions of production, the exchange vessel concept is preferred, i.e., ready-to-use, optionally preheatable stand-by vessels (fi. a converter vessel 3 and a unit comprised of a furnace vessel 1 and a decanting vessel 2) are available within a short time.

Plant variants depending on the charge mix (guidelines for selecting the overall plant configuration):

An overall plant configuration with scrap preheating shaft 5 and heating part 9, as represented in FIG. 1, is applicable in cases where a specific minimum portion of solid scrap 7 within the charge mix is employed. As a general guideline for selecting the overall plant configuration as a finction of the charge mix, the following Table I can be used:

TABLE I

| Portion of scrap (%) in the charge mix as a selection criterion | Plant configuration Main plant parts | Variant, represented in FIG. |
|---|---|---|
| <15% | furnace vessel 1, converter vessel 3 | 3/4 |
| 15–30% | preheating shaft 5, furnace vessel 1, converter vessel 3 | 5/6, 9/10 |
| >30% | heating part 9, preheating shaft 5, furnace vessel 1, converter vessel 3 | 1/2, 7/8 |

Figure 3:
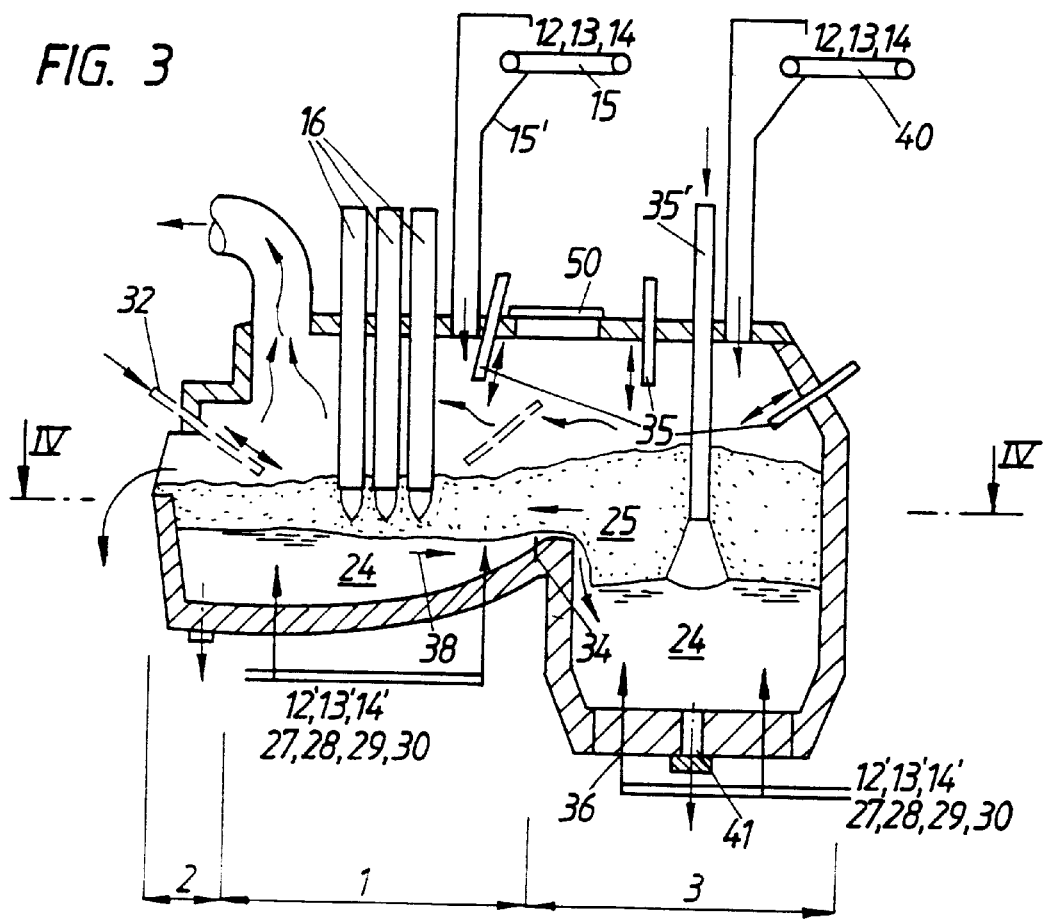
FIGS. 3, 4 and 5, 6 as well as 7, 8 and 9, 10 each show alternative embodiments in illustrations analogous to FIGS. 1 and 2, respectively.
Figure 4:
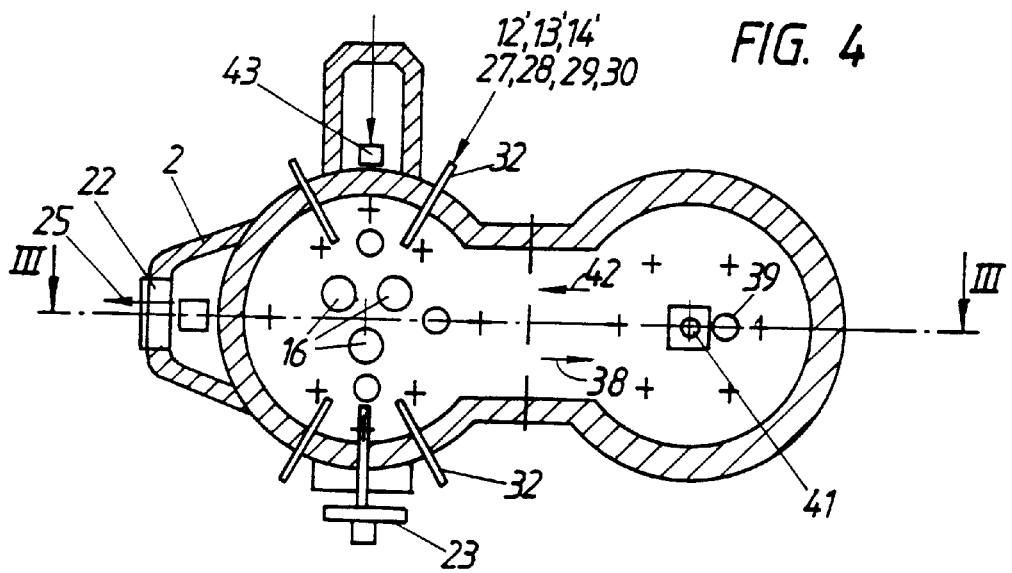

According to FIGS. 3, 4, the scrap portion 12 is introduced into the furnace vessel 1 and/or into the converter vessel 3 via the lid openings 11 or 39 by means of the conveyor-belt-and chute system 15, 15' or 40, with the maximum dimension of the scrap pieces 12 not being allowed to exceed a predetermined measure (f.i. 200 mm).

Figure 5:
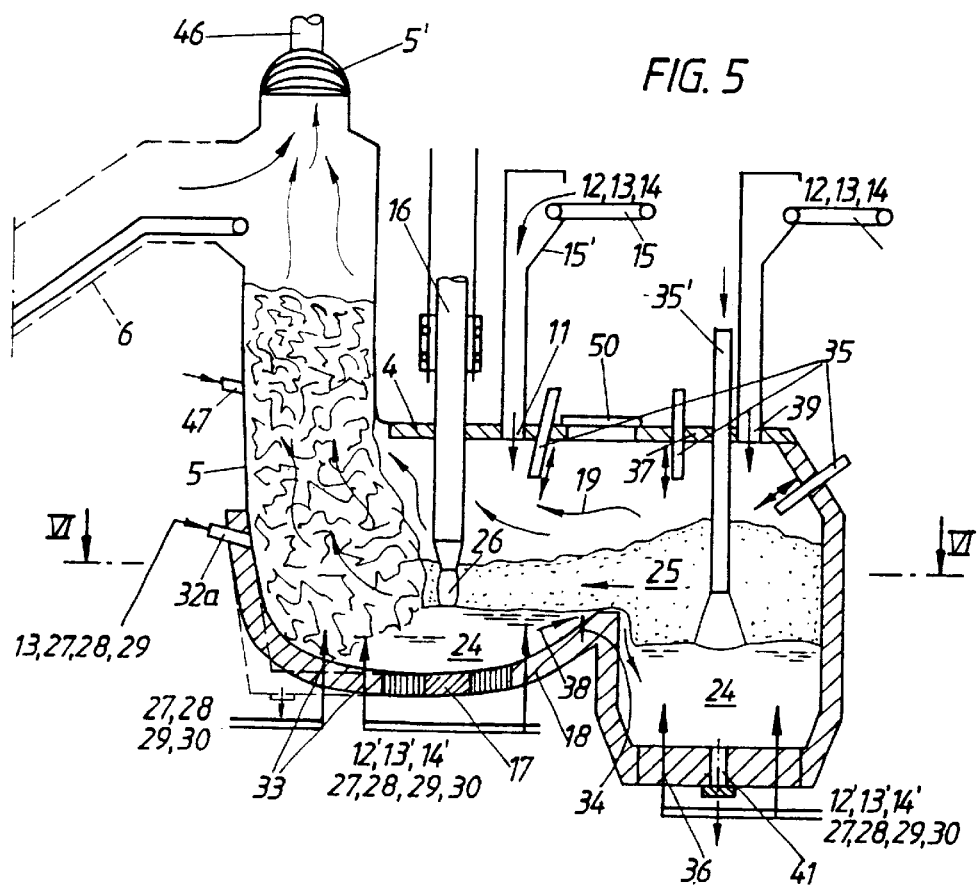
Figure 6:
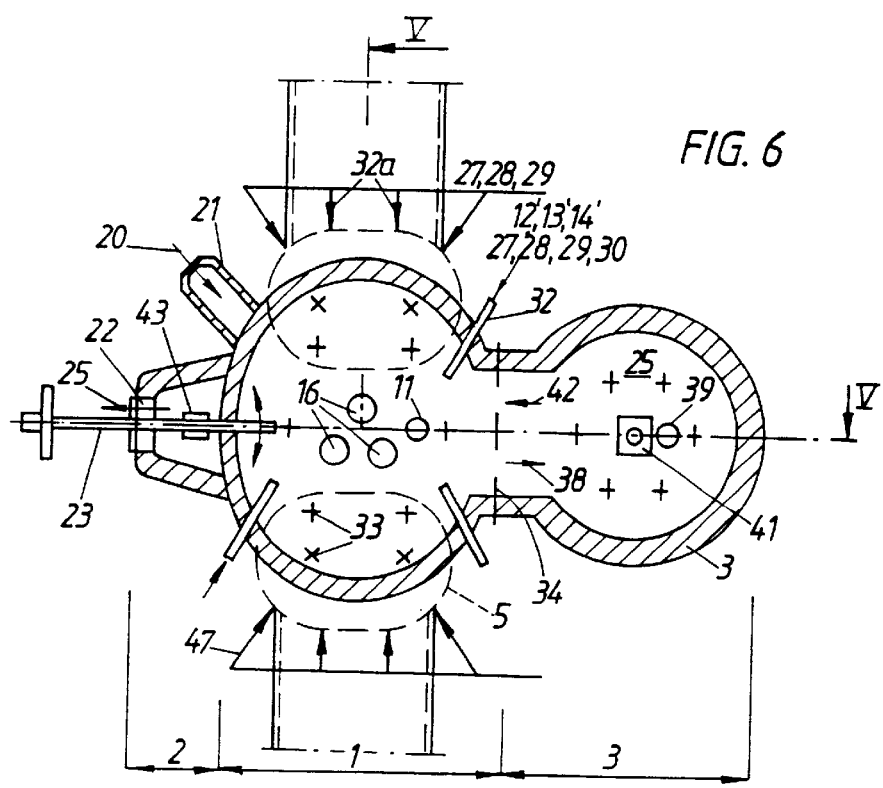

According to FIGS. 5, 6, the scrap preheating shaft 5 has only a small cross-section since only a small quantity of scrap is charged, and it is charged continuously by means of a scrap conveying belt 8 without a preheating function, i.e. without a heating part 9. With this variant, oversize scrap pieces must, if necessary, be separated and cut prior to charging. Carrying-off of the offgases is in the upper, so-called hood region 5' of the scrap preheating shaft 5 via the offgas duct 46.

In accordance with the variants illustrated in FIGS. 1, 2 and 7, 8, at least one scrap preheating shaft 5 is continuously charged by means of at least one scrap conveying belt 8 with preheating function, i.e. by means of a heating part 9. Depending on the charge mix (in particular the scrap portion)

the actual space and height conditions existing in a given case of application (the plant layout)

the desired operating parameters (plant productivity, consumption of electric energy, availability of fossil fuels, such as fi. natural gas, coal, etc.), f.i. the following variants of embodiments of scrap preheating shaft 5 and heating part 9 are conceivable here:

a scrap preheating shaft 5 with a heating part 9 with one scrap conveying belt 8 or several scrap conveying belts 8 arranged in parallel relationship (FIGS. 1, 2)

two scrap preheating shafts 5 (FIGS. 7, 8) having one heating part 9 each or sharing a common heating part 9, with each heating part 9 encasing at least one scrap conveying belt 8.

Carrying-off of the offgases 19 is via a hot gas duct (not illustrated) disposed at the beginning of the heating part 9.

Figure 9:
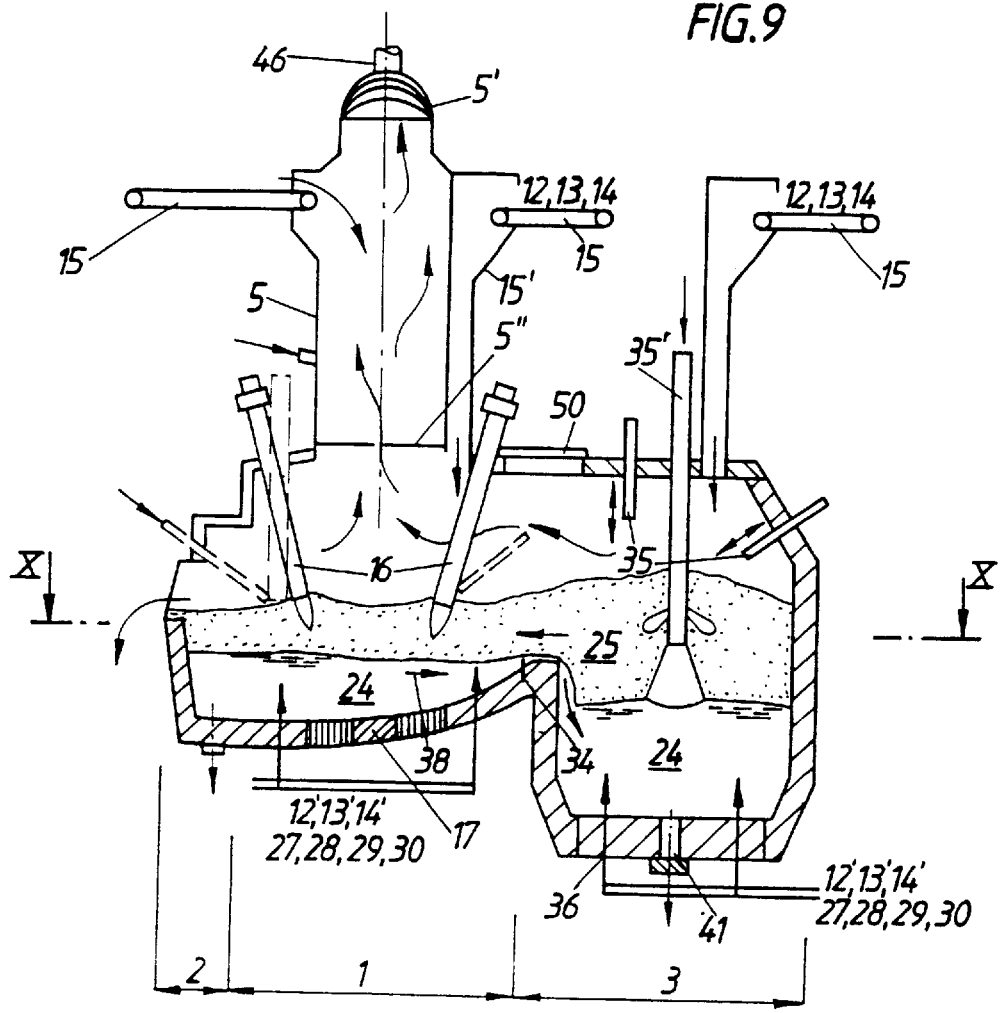
Figure 10:
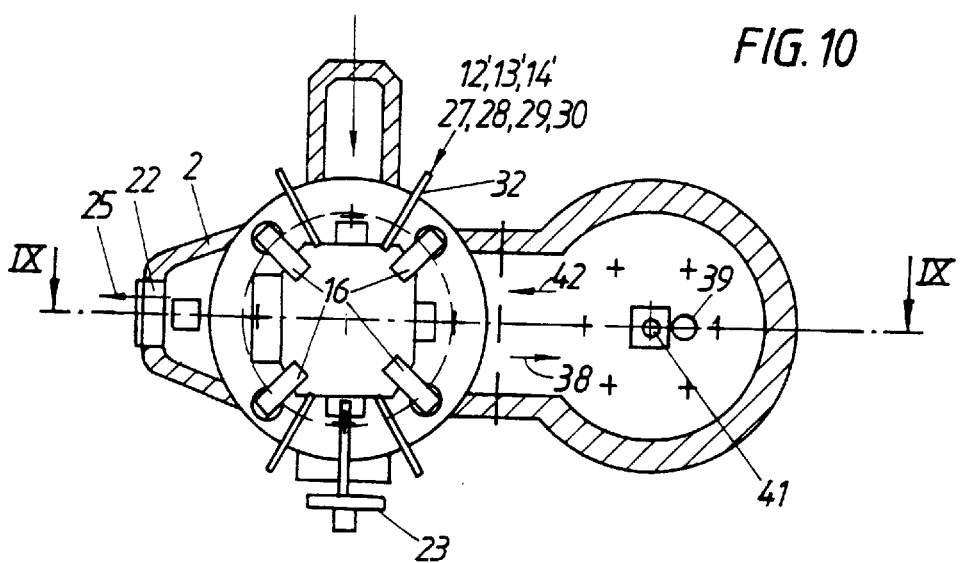

According to the variant shown in FIGS. 9 and 10, a preheating shaft 5 with a gas-permeable and water-cooled shut-off device 5" is mounted on top of the lid 4 of the furnace vessel 1, which shaft can be charged with metallic charging substances 7—predominantly steel scrap, optionally even solid pig iron—preferably via a conveyor belt 15. The furnace vessel 1 is equipped with several cathodically switched oblique graphite electrodes 16, which are optionally configured as hollow electrodes and are preferably disposed in a symmetrical arrangement relative to the electric arc furnace and the mounted preheating shaft 5. The electrodes 16 are pivotable within an angle of inclination of 0 to 30° relative to the vertical in the direction of the center of the furnace vessel 1 and up to 10° in the opposite direction towards the wall of the furnace vessel 1. The angle of inclination may be adjusted and/or controlled differently for each individual electrode 16. During the melting operation it usually amounts to about 15 to 20°. Occasionally, pivotability of the electrodes 16 may be renounced. As counter electrode 17 there serves a bottom anode arranged centrally in the bottom 18 of the furnace vessel 1.

The fundamental principles of the finctioning and control of the process may be summed up as follows:

Supply of the charging substances/process media and discharge of the products:

Continuous supply of the charging substances and media at controllable velocity into the furnace vessel 1 (principal amount) and simultaneously into the converter vessel 3 (a partial amount thereof as a cooling agent).

Figure 7:
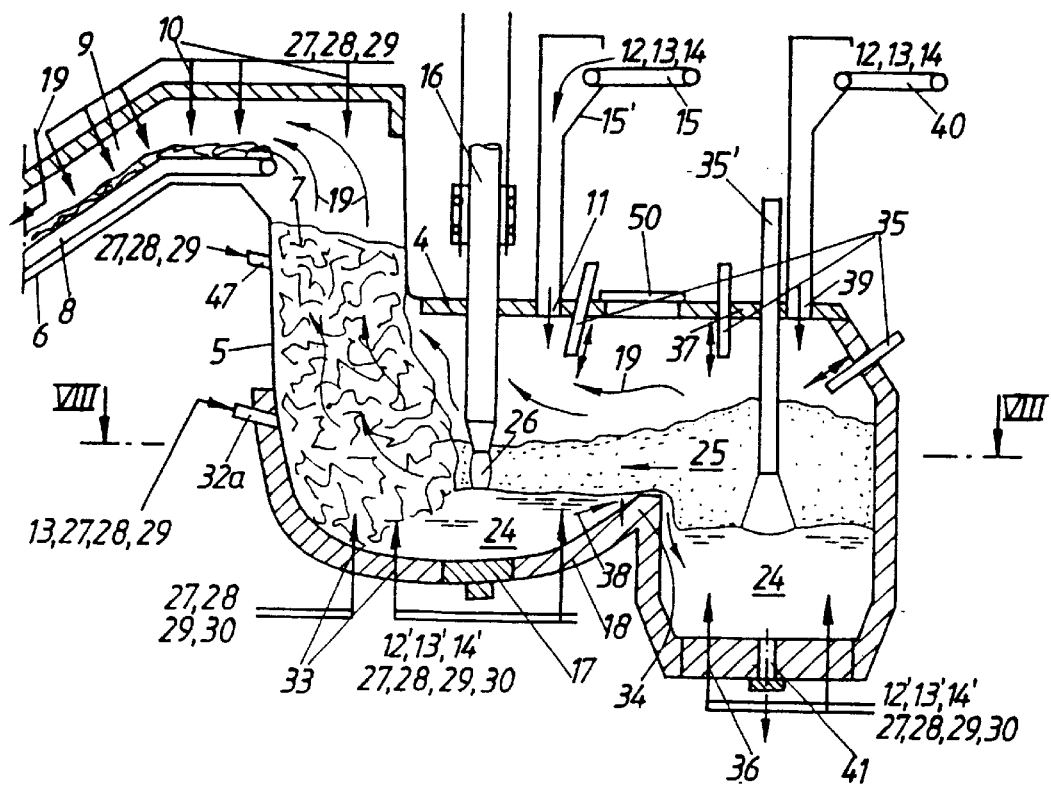
Figure 8:
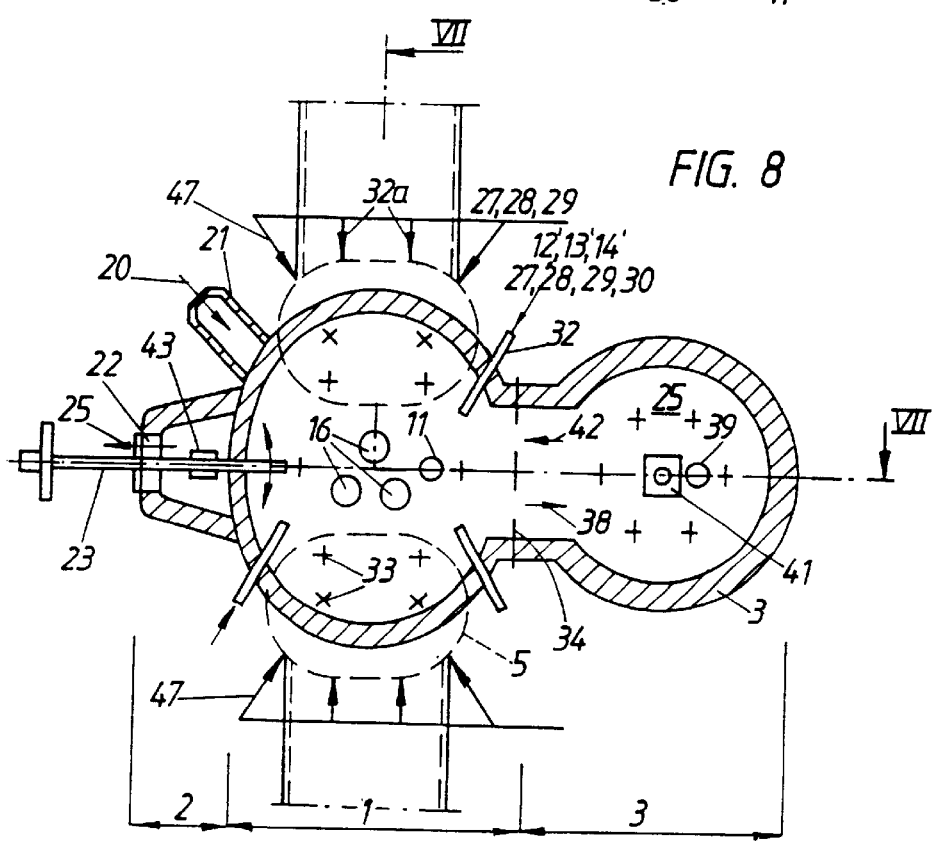

Continuous discharge of the products from at least two plant parts, namely preferably crude steel from the converter vessel 3 and slag 25 from the decanting vessel 2 arranged directly adjacent the furnace vessel 1 as well as offgas 19 depending on the plant configuration in accordance with the charge mix:

from the furnace vessel with the plant variant of FIGS. 3, 4, from the preheating shaft 5 with the plant variant of FIGS. 5, 6 and the variant of FIGS. 9, 10 or from the heating part 9 with the plant variant of FIGS. 1, 2 as well as of FIGS. 7, 8.

It is feasible to discontinuously tap crude steel from the converter vessel 3 with or without a throttling of the overall plant, wherein, if requirements regarding the quality of the crude steel are high, a retaining dam is mounted on the overflow weir 34 on the furnace end thereof, to limit or prevent backflow of the furnace slag 25 into the converter vessel 3 during discontinuous tapping of crude steel and thereafter (until establishment of equal slag levels within the furnace vessel 1 and within the converter vessel 3).

Process sequence and mixing ratios:

in the case of continuous crude steel tapping—continuous semi-stationary condition with respect to the temperature, concentration, flow, mixing and quantities of the metal, slag and offgas in each vessel of the overall plant in the case of discontinuous crude steel tapping—with a pronounced tapping cycle in regard of the above-listed criteria with regard to metal and slag in the converter vessel 3 and with regard to slag in the furnace vessel 1, otherwise semi-stationary Irrespective of the manner of tapping the crude steel (continuously or discontinuously), the following requirements concerning the process course are fulfilled continuously:

intensive mixing of the bath within the furnace vessel 1 and within the converter vessel 3, large reaction and heat-exchanging surfaces in all plant parts, crude steel in the converter vessel 3 is at all times maintained at the composition and temperature desired for tapping.

Preheating, melting, refining and temperature control:

A stepwise change of the physico-chemical properties of the charging substances is effected (in particular of the temperature, the chemical composition and the condition of matter) with a view to producing crude steel melt as the main product as well as slag and offgas as by-products with optimum utilization of energy in accordance with the following scheme:

In the heating part 9 and preheating shaft 5:

Preheating of the scrap (up to 100% of the scrap in the charge mix) taking into account the criteria for selecting the plant configuration, wherein in the heating part 9 (if provided) preheating to a low temperature, f.i. max. 400–450° C., is effected and in the preheating shaft 5 (if provided) preheating to a more elevated temperature, f.i. $\geq 800°$ C. (scrap preheating temperatures of 1000° C. and higher are perfectly feasible, possibly with a lined preheating shaft) is carried out.

It is also feasible to preheat other charging materials beside scrap, such as f.i.

lumpy slag formers (dolomite, quartzite etc.), lump coal or lump coke, optionally sponge iron (up to a limited portion of the charging substances by means of the heating part 9 and/or the preheating shaft 5), yet, taking into consideration possible undesirable phenomena (re-oxidation, increased flame chipping, etc.), in dependence on their retention time and the preheating temperature in the heating part 9 and/or preheating shaft 5.

In the furnace vessel 1:

melting of the major portion (principal amount) of the charging substances in the charge mix (except for the smaller partial amount of the charging substances provided as cooling agents, which are needed in the converter vessel 3 and are directly charged there) and at the same time carburization and prefining of the metal with the aim of producing a pre-melt having approximately the following properties in dependence of the charge mix:

% Si$\leq$0.10

% C=1.0–3.0

T=1540–1560° C.(∅ about 1550° C.), which pre-melt flows over into the converter vessel 3, with the mean decarburization velocity amounting to 0.06 to 0.10 (max. 0.12) % C/min in dependence on the charge mix, and under continuous feeding of cold charge-mix components, e.g. sponge iron and/or iron carbide, optionally fine scrap and/or hot charge-mix components, e.g. liquid pig iron (from a precedingly arranged blast furnace or a melt reduction), hot sponge iron and/or iron carbide and lump coal and/or fine coal (coke, SLF), lumpy and/or dust-like slag formers (lime, dolomite, quartzite, fluorspar, etc.).

In the converter vessel 3:

continuous final refining (mainly decarburization as well as in-depth dephosphorization) and at the same time heating of the high-C pre-melt constantly overflowing from the furnace vessel 1 to the crude steel composition and temperature which are desired for the tapping of the crude steel and are already (at all times) adjusted in the converter vessel, while balancing out the concentration and temperature by intensive mixing of the bath (homogenization) at continuous feeding of lumpy and/or fine-grained cooling agents (incl. charge-mix components) and/or slagformers, and/or carbon carriers, f.i. sponge iron and/or iron carbide, fine scrap, ore, scales, metallurgical dusts/sludges, limestone, dolomite, lime, quartzite, fluorspar, etc., coal, (coke), treated shredder light fraction and without interrupting the refining process during a discontinuous tapping of crude steel, if provided, i.e. without interrupting and considerably influencing the process course in the precedingly connected plant parts (optionally slight throttling may be feasible), with the preferred decarburization velocity amounting to 0.08 to 0.13 (max. 0.15) % C/min in dependence on the charge mix.

Slag Control

The concept of the process is based on a countercurrent movement of metal 24 and slag 25 in the region furnace vessel 1/converter 3, i.e. the slag moves from the converter vessel 3, which is the plant part with the highest temperature and the highest oxygen potential of the metal bath, via the furnace vessel 1—this latter has a lower temperature and a lower oxygen potential of the metal bath, since it contains a metal melt rich in C—in the direction of the slag door 22 at the end of the decanting part 2, where the slag 25 may first leave the plant. The driving force behind this movement of the slag 25 is, above all, gravity, assisted by impulses transmitted to the slag 25 due to the intensive mixing of the bath in the converter vessel 3 and in the furnace vessel 1. In the course of this movement (especially when traversing the furnace vessel 1), the slag 25 encounters a metal melt 24 having a low temperature and higher contents of Si and C and, due to the intensive mixing of the bath, is reduced with respect to FeO content by that melt and at the same time is cooled by it. In addition to this, the partial amount of the slag 25 from the converter vessel 3 mixes with nonmetallic phases arising in the furnace vessel 1 and in the decanting part 2, namely—from the gangue and ashes of the components of the charge mix (sponge iron, HBI, iron carbide, scrap, etc.), from the oxidation of Si, Mn, P and other elements with an affinity for oxygen which are present in the charge mix (liquid and/or solid pig iron, scrap etc.), from the slagformers supplied to the furnace vessel 1, which are added f.i. as correction fluxes, from the refractory wear in the furnace vessel 1 and in the decanting part 2, as a result of which the amount of the formed slag 25 in the furnace vessel 1 considerably larger than that of the slag formed in the converter vessel 3. After a certain "quieting" of the slag 25 in the decanting part 2 (without intensive mixing of the bath) and partial raining out of the metal droplets it contains, the slag 25 leaves the plant through the slag door 22 at the end of the decanting part 2.

In contrast to the discontinuous process, an important process feature is to be seen in that the specific amount of slag, based on the amount of metal in the converter vessel 3, is not equal to the very small amount of slag per ton of the pre-melt overflowing from the furnace vessel 1 but is much higher, and when operating in the continuous crude steel tapping mode and with a nearly constant level of the metal melt in the converter vessel 3 it is determined by the height difference between the furnace vessel 1 and the converter vessel 3 or may be controlled thereby within certain boundaries. At the same time, this process feature has the effect that the retention time in the converter vessel 3 of the slag 25 (with very good properties concerning dephosphorization and desulphurization) formed within the converter vessel 3 is considerably higher than f.i. in a discontinuous LD converter and, besides, can be controlled, whereby the following advantages result:

improved utilization of the refining properties of the slagformers supplied to the converter vessel 3, the possibility of achieving very low contents of P and S in the crude steel (one contributive factor in this respect is the process and plant configuration, which in principle corresponds to a discontinuous process with intermediate tapping of a partial amount of the slag), no danger of formation of skulls in the oxygen-blowing lance 35 in the converter vessel 3 due to a very small amount of slag, which is well known to occur f.i. with discontinuous converter processes with charging of pretreated pig iron (deSi+deP) and slag-poor refining (slag minimum process) at $\leq 30$ kg slag/t steel.

To better utilize the slagformers supplied in the furnace vessel 1 it is of advantage to introduce them in the form of lumps that are as small as possible, so that their dissolution in the slag 25 will be as rapid and complete as possible. This applies especially to lime and dolomite. By preferably feeding up to 100% of the lime or the dolomite to the furnace vessel 1 in fine-grained condition (as powdered lime or powdered dolomite, respectively), it is also feasible to considerably limit the negative effects of the so-called "hot spots" in the case of the furnace being configured as an a.c. To the converter vessel 3, lumpy slagformers are preferably supplied (fine-grained slagformers being fed only in the case that extreme requirements with regard to the quality of the crude steel must be met with).

The properties of the slag 25 in the converter vessel 3 and in the furnace vessel 1 (roughly identical with the final slag at exit from the slag door 22 on the end of the decanting part 2) as they are preferred according to the invention may be summed up as follows:

Converter slag in the range of technical lime saturation

% CaO/% $SiO_2 \geq 3.4$

% MgO$\geq 7$

% $FeO_n$=25–30 in the case of crude steel

% C=0.03–0.05

$T_{tap}$=1620–1630° C.

preferred feeding of lumpy slagformers (lime, dolomite, quartzite)

preferred retention time in the converter vessel 3: ≧80 min furnace slag=final slag at emergence from the plant % CaO/% SiO$_2$=1.8–2.0

% MgO≧7

% FeO$_n$=10–15% in the case of pre-melt

% C=1.0–3.0

T$_{overflow}$=1540–1560° C.

EAF→LD preferred feeding of fine-grained slagformers (in particular powdered lime, powdered dolomite) via several nozzles/lances in/through the furnace lid 4, supply of materials into the "hot-spot" areas.

These basic principles of slag control also apply to the process variant with discontinuous tapping of crude steel. No essential difference arises due to the dam which optionally is to be used here and which is only employed in the case of high quality requirements.

Offgas parameters (capturing, afterburning, temperature, dust and poisonous components in the crude gas):

Offgas from the converter vessel 3 and from the furnace vessel 1 is concertedly withdrawn through the scrap preheating shaft 5, where provided, and optionally through the heating part 9, wherein the chemical and the physical heat of the offgas are optimally (distributed and) utilized; if no preheating shaft 5 is provided, the offgases from the fturnace vessel 1 pass into the hot gas duct directly connected thereto. Nearly 100% of the offgas are captured by a shut-off system with a minimum of uncontrolled emissions and a minimal load due to heat, dust and poisonous components in the offgas, as there is no need for opening a plant part for carrying out charging operations. The offgases are afterburned to an increasing extent as they proceed from the converter vessel 3 to the furnace vessel 1 and onward to the preheating shaft 5 as well as to the heating part 9, depending on the given requirements and the charge mix.

Note the following standard values:

| Plant part | CO + H$_2$-degree of afterburning % | offgas temperature ° C. |
|---|---|---|
| converter vessel 3 | 10–15 | T ≦ 1700 |
| furnace vessel 1 | about 30 without shaft about 40 with shaft | T ≦ 1700 |
| preheating shaft 5 | 60–70 | 800 ≦ T ≦ 1500 |
| heating part 4 | 85–100 | 800 ≦ T ≦ 1300 |

Preferred media for offgas afterburning

| Type of media | Preferred application |
|---|---|
| O$_2$ | converter vessel 3 |
| O$_2$ + air | furnace vessel 1, preheating shaft 5 |
| air | heating part 9 |

For all plant parts, O$_2$/air mixtures are availabe whose mixing ratios can be adjusted as desired.

Additional heat sources/energy supply for satisfying the heat demand Standard values according to the following table:

Standard portion for meeting the heat demand, (%)

| Plant part | Oxidation of Fe | Oxidation of accompanying elements C, Si etc.[1] | CO + H$_2$ afterburning | Burner | Electric energy |
|---|---|---|---|---|---|
| heating part 9 | 3–9 | <1 | ≧80 | 0–10 | — |
| preheating shaft 5 | 20–30 | <1 | ≧70 | — | — |
| furnace vessel 1 | — | 10–20 | 15–20 | 10–15 | 50–60 |
| converter vessel 3 | 15–25 | ≧60 | 10–15 | — | — |

[1]incl. slag-forming heat for slagging oxidation products

Exemplary Embodiments

The three following exemplary embodiments illustrate the technological sequence and the results achievable in the application of the process and plant variants of the invention for continuously producing crude steel from the charging substances (iron carriers) that are most important worldwide, such as steel scrap, sponge iron and liquid pig iron. The charge mix is different for each exemplary embodiment, namely:

| Exemplary embodiment 1: | 100% steel scrap |
|---|---|
| Exemplary embodiment 2: | 40% steel scrap |
| | 30% sponge iron |
| | 30% liquid pig iron |
| Exemplary embodiment 3: | 50% sponge iron |
| | 50% liquid pig iron |

The process and plant variants of the invention also allow the continuous production of crude steel from 100% sponge iron or from 100% liquid pig iron, wherein in the latter case ore, carbonate, scales, dust briquettes, etc. may be employed as cooling agents individually or in combination.

In addition to the Fe-containing charging substances, there are also used in accordance with the Exemplary embodiments:

| fluxes: | soft burnt lime, dolomite, quartzite |
|---|---|
| gases: | oxygen, nitrogen, natural gas, air (compressor and ventilator) |
| solid coal: | lump coal, fine coal (blowing coal) |
| refractory materials: | bricks for lining the furnace - and also the converter vessel 3, gunning materials (repair) |
| graphite electrodes: | for the furnace vessel 1 and |
| cooling water: | for water cooled panels of the furnace vessel 1, of the preheating shaft 5 and of the heating part 9 | all of which are customary in steel-making practice. In spite of being more cost-advantageous and/or being of advantage in view of a better steel quality, the possible use of alternative

| Fe-containing charging substances: as Fe-carriers and/or as cooling agents: | solid pig iron iron carbide, filter dust, scales, dried sludge, ore (Fe-/Mn ore) |
|---|---|
| fluxes: | fine lime, fine dolomite, fluorspar |
| media: | Ar (for inert-gas bottom flushing) |
| energy sources: | shredder light fraction | is renounced in the following exemplary embodiments.

The quality and the temperature of the available charging substances and gases can be seen from Tables II, III and IV.

For carrying out the process, the following plant configurations are employed:

Exemplary Embodiments 1 and 2:

Plant according to FIG. 1 comprising a heating part 9 (conveyor belt 8 with preheating function)

a scrap preheating shaft 5 of oval cross-section a furnace vessel 1 configured as an AC-EAF as a melting and prefining vessel a converter vessel 3 of the type LD-S* a decanting part 2 associated with the furnace vessel 1

* converter with inert-gas bottom flushing $N_2$/Ar

Exemplary Embodiment 3:

Plant according to FIG. 3, comprising an AC electric arc furnace as the furnace vessel 1, as the melting and prefining vessel a converter vessel 3 of the type LD-S* a decanting part 2

* converter with inert-gas bottom flushing $N_2$/Ar

TABLE II

Chemical composition and temperature of the Fe-containing charging substances

| steel scrap | 0.30% C | 2.5% ashes |
| | 0.50% Mn | 0.2% moisture |
| | 0.20% Si | |
| | 0.030% S | 25° C. |
| | 0.020% P | |
| sponge iron pellets (MIDREX-DRI) | 91.9% $FE_{tot}$ | |
| | 92.9% degree of metallization | |
| | 1.8% C | |
| | 4.6% gangue | |
| | about 0.5 gangue basicity | |
| | 25° C. | |
| liquid pig iron | 4.2% C | 1320° C. |
| | 0.5% Mn | |
| | 0.6% Si | |
| | 0.04% S | |
| | 0.09% P | |

TABLE III

Chemical composition, grain size and temperature of fluxes, solid fuels and refractory materials

| lime (10–30 mm) | dolomite (10–30 mm) | quartzite (<5 mm) | |
| --- | --- | --- | --- |
| 92.0% CaO | 54.0% CaO | 96.0% $SiO_2$ | |
| 1.0% MgO | 41.0% MgO | | |
| 2.4% $SiO_2$ | 2.9% $SiO_2$ | | |
| 25° C. | 25° C. | 25° C. | |
| lump coal (3–15 mm) | fine coal (<3 mm) | lining (bricks) EAF and LD converter | |
| 84.0% C | 92.0% C | 96.5% MgO | 97.0% MgO |
| 0.5% S | 0.5% S | 2.1% CaO | 1.9% CaO |
| 9.4% volatile matter | 2.0% volatile matter | | |
| 6.1% ashes | 5.5% ashes | 10% C* | 10% C* |
| 25° C. | 25° C. | 1550° C. | 1620° C. |
| | | | gunning materials: ≧ 95% MgO |

*Residual C (firing in red. atm at 1000° C. - British Coking Test)

TABLE IV

Chemical composition (vol.%), temperature of gases

| natural gas | oxygen (lances) | oxygen (burner) | nitrogen (conveyance + flushing) | air (ventilator air, compressor air) |
| --- | --- | --- | --- | --- |
| 96 v. % $CH_4$ | 99.7 v. % $O_2$ | 96.0 v. % $O_2$ | 99.9% $N_2$ | 79 v. % $N_2$ |
| | | | | 21 v. % $O_2$ |
| 25° C. | 25° C. | 25° C. | 25° C. | 25° C. |

* Residual C (firing in red.atm at 1000° C.—British Coking Test)

In all three embodiments, the furnace vessel 1 and the converter vessel 3 exhibit the following, identical configuration and equipment, with the specification referring to conventional discontinuous plants according to standard lines:

Specification of the furnace vessel 1:

a vessel diameter of about 6 m corresponds to a discontinuous tap weight of 90 t crude steel at about 11 t liquid sump (residual sump), 70 MVA transformer output, a.c., three pieces of graphite electrodes 16, each 560 mm in diameter (no bottom anode 17, due to a.c. power supply), one pig iron chute 21 for continuously supplying liquid pig iron 20, two charging openings 11 arranged in the lid 4 for continuously supplying sponge iron pellets and/or fine scrap 12, lump coal 13 and lumpy slagformers (lime, dolomite, quartzite) 14 transported to the spot via a conveyor-belt-and-chute system 15, three pieces of lime nozzles in the lid 4 of the furnace vessel 1 for continuously blowing in up to 100% of the amount of lime and dolomite supplied in the furnace vessel 1 as lime dust or powdered dolomite 14 into the hot spots using air 28 as a carrier gas, two pieces of water-cooled manipulator lances (one lance 32 through the sidewall of the furnace vessel 1, one lance 23 through the slag door 22 in the decanting part 2 projecting on into the furnace vessel 1) for continuously blowing in gaseous oxygen 27 and/or fine coal 13 (air 28 as a carrier gas) below the surface of the slag 25 within the furnace vessel 1, three pieces of coal sub-bath nozzles 33 for continuously blowing in fine coal 13 using air 28 as a carrier gas, six pieces of inert-gas sub-bath nozzles 33 for continuously blowing in an inert gas 30 ($N_2$/Ar, ratio adjustable as desired) for intensive intermixing of metal 24 and slag 25 in the furnace vessel 1, three pieces of $O_2$ sub-bath nozzles 33 for continuously blowing in gaseous oxygen 27, with the $O_2$ sub-bath nozzles 33 being protected with natural gas or LPG (liquid propane gas) 29 and disposed in the bottom of the furnace vessel 1 preferably below the scrap preheating shaft 5, five pieces of natural gas/oxygen burners 32a with a capacity per burner of max. 3.5 MW, disposed in the side wall of the furnace vessel 1 in a roughly symmetrical arrangement below the scrap preheating shaft 5, three pieces of afterburning nozzles 35 in the lid 4 of the furnace vessel 1 for gaseous oxygen 27 and/or air 28 ($O_2$/air ratio adjustable as desired), which are preferably configured as movable short lances, i.e. as afterburning lances, a lid 4 of the furnace vessel 1, which lid on its outside is formed from water-cooled panels which are provided with a refractory layer from the inside (furnace interior), a wide part of the side wall of the furnace vessel 1 on the side of the converter vessel 3, which part is constructed as a weir 34, resulting on the one hand in a division of the lower part of the plant into a furnace vessel 1 and a converter vessel 3, and on the other hand in the formation of an upper part which is common to the two vessels, such that a continuous transfer of metal melt 24, slag 25 and offgas 19 between the reactor parts 1 and 3 is accomplished by means of gravity alone, with metal 24 flowing in a direction opposite to that of the slag 25 (so-called metal/slag counterflow movement), the offgases from the subdivisions within the furnace vessel 1 and the converter vessel 3 being driven through the charged scrap 7 inside the furnace vessel 1 and in the scrap preheating shaft 5 located directly therebove by means of the concerted offgas suction, or, as illustrated in FIG. 3, pass directly from the furnace vessel 1 into the hot gas duct of the offgas treatment plant (not illustrated), in case the overall plant configuration does not provide for a scrap preheating shaft 5 and/or heating part 9.

Specification of the converter vessel 3:

internal volume after fresh lining about 76.5 m$^3$, specific volume about 0.85 m$^3$/t metal content (corresponds roughly to a discontinuous tap weight of about 90 t/crude steel for a conventional plant), one water-cooled converter lance (top lance) for top-blowing max. 10000 Nm$^3$ O$_2$/hour, three pieces of afterburning nozzles 35 for gaseous oxygen 27 and/or air 28 (O$_2$/air ratio adjustable as desired) in the lid 37 and in the upper conical part of the converter vessel 3, which are preferably configured as movable short lances, i.e. as afterburning lances, two charging openings 39, of these preferably only one in operation (only one of them is illustrated in FIGS. 1 and 3) in the converter lid 37 for continuously supplying fine scrap (here: shredder scrap of ≦100 mm piece size) and/or sponge-iron pellets (DRI) 12, lump coal 13 and lumpy slagformers (lime, dolomite, quartzite) 14, which are transported to the spot via a conveyor belt/chute system 40, six pieces of inert-gas sub-bath nozzles 36 for continuously blowing in an inert gas 30 (N$_2$/Ar, ratio adjustable as desired) for intensive intermixing of metal 24 and slag 25 in the converter vessel 3, a crude steel tap opening 41 with a control unit for the tapping velocity of the crude steel 24 as well as automatic closing means (not explained more fully here) for interrupting the otherwise continuous tapping operation, if necessary, a lid 37 of the converter vessel 3, which lid is of a construction identical to that of the lid 4 of the furnace vessel 1 and, in interlocked condition, forms a unit (sectional configuration) therewith during operation. Roughly above the weir 34, it is provided with a control and repair opening 50. That opening remains closed during the continuous process course.

Specification of the scrap preheating shaft 5, the heating part 9 and the scrap-conveying belt 8:

To fulfil the rather diverse requirements regarding the supply and preheating of scrap with the three embodiments under consideration (100%, 40%, 0% scrap in the charge mix), the following means are provided:

1. A scrap preheating shaft 5 having a large internal effective cross-section of about 11.5 m$^2$ and rounded edges, as illustrated in FIGS. 1 and 2.

a roughly constant shaft cross-section throughout the shaft height, the shaft height above the lid 4 of the furnace vessel 1, i.e. above the level of entry of the shaft into the furnace vessel 1 up to the upper hood region (lid) of the preheating shaft 5 is about 6.50 m, wherein the preheating shaft 5 is formed from water-cooled panels which in the upper hood region are internally provided with refractory plates (as can be seen in FIG. 1), the preheating shaft 5 is provided with twelve afterburning nozzles 47 for oxygen 27, air 28 or an oxygen/air mixture, with these afterburning nozzles 47 being disposed in a roughly symmetrical arrangement on the outer perimeter of the shaft in two planes, with six nozzles being provided in each plane, in the upper hood region of the preheating shaft 5 there are provided two natural-gas/oxygen/air combined burners 10 which at the same time may also be used as afterburning lances and as burners may be operated with max. 3.5 MW per burner.

Basically, the entire preheating shaft 5 may be constructed from water-cooled panels with an internal brick lining, whereby the following advantages may be achieved:

low heat losses by the cooling water in the preheating shaft, i.e. a smaller quantity of cooling water is needed higher scrap preheating and offgas temperatures at exit from the shaft are adjustable without the danger of breakdown 2. A scrap preheating shaft 5 having a small internal effective cross-section of about 5 m$^2$ and rounded edges (as illustrated in FIG. 1):

a roughly constant shaft cross-section throughout the shaft height, total shaft height about 6.50 m, wherein the preheating shaft 5 consists of water-cooled panels which internally are provided with refractory plates in the upper hood region, the preheating shaft 5 is provided with eight afterburning nozzles 47 for oxygen 27, air 28 or oxygen/air mixtures, with these afterbu rning nozzles 47 being disposed in a roughly symmetrical arrangement on the outer perimeter of the shaft in two planes, four nozzles being arranged in each plane, in the upper hood region of the shaft 5 there is arranged a natural gas/oxygen/air combined burner 10 which at the same time may also be used as an afterburning lance and in its capacity as a burner is designed for a capacity of max. 3.5 MW.

3. A heating part 9 is provided with two identical scrap conveying belts 8 disposed in parallel side by side inside the heating part 9, which belts are spatially isolated from each other within the common casing by a refractory dam (not illustrated in the drawings). The conception of the heating part 9 and the scrap conveying belts 8 can be summed up as follows:

| Scrap conveying belt 8 | |
|---|---|
| number (identical construction): | 2 |
| belt width: | 2.0 m |
| belt length: | 40.2 m |
| mean belt loading (t scrap/m² belt surface): | 0.30 t/m² |
| belt velocity: | max. 8 m/min |
| scrap conveying capacity per belt 8: | max. 4.8 t/min |
| Heating part 9 shape of the casing | |
| top: | shaped like a partial circle, water-cooled panels with bricklining on their inner face |
| bottom: | rectangular, water-cooled panels, without bricklining |

Ten natural-gas/oxygen/air combined burners/lances 10 (if operated as burners: max. 3.5 MW per burner, or if operated as afterburning lances: max. 3000 Nm³/h air or air/O$_2$ mixture per lance 10), disposed in two rows (five pieces in each row) in the brick lid of the heating part 9 in a symmetrical arrangement above each of the two scrap conveying belts 8.

A vertically oriented refractory dam (wall) dividing the entire interior space of the heating part 9 in the longitudinal direction into two subdivisions almost completely separate from each other, having one scrap conveying belt 8 each.

Course of Process and Results

Exemplary embodiment 1

The charge mix consists of 100% steel scrap (mixed scrap) having the composition shown in Table II. The process is carried out using the plant variant according to FIG. I with the scrap preheating shaft 5 having an internal effective cross-section of 11.5 m² and with two scrap conveying belts 8 (each with a belt width of 2.0 m and a belt length of 40 m), which are arranged in parallel side by side and prior to unloading the scrap 7 into the preheating shaft 5 pass through a common heating part 9 which is 10 m in length, with the heating part 9 opening directly into the upper hood region of the preheating shaft 5.

A small partial amount (11.50%) of the scrap with a piece size ≦100 mm is fed into the converter vessel 3 continuously as a cooling agent 12 at a temperature of 25° C. The rest of the scrap, which has a max. length of the scrap pieces of 1.5 m (i.e. the principal partial amount 7 of 88.50%), is charged onto the two scrap conveying belts 8 by means of four scrap charging cranes and after preheating in the heating part 9 and in the preheating shaft 5 is fed to the furnace vessel 1 in a continuous manner and is melted therein. The mean height of the scrap column 7 in the preheating shaft 5 is about 2.5 m. The heat sources employed for preheating the scrap 7 in the heating part 9 and in the preheating shaft 5 are the sensible heat (enthalpy) and the chemical heat (heat from the partial afterburning) of the offgases 19 flowing into the preheating shaft 5 or into the heating part 9 predominantly from the furnace vessel 1 as well as the heat arising from a certain scrap oxidation taking place during the preheating of the scrap. The partial afterburning of the offgases 19 in the preheating shaft 5 is carried out in two steps, with cold air 28 and gaseous oxygen 27 being blown in continuously through the twelve afterburning nozzles 47 disposed in two planes, in a ratio of volumes of roughly air/O$_2$~4.2. In the heating part 9, afterburning is effected in a step-wise manner along the heating part 9 by continuously blowing in cold air 28 through the—in all—ten combined burners/lances 10 (here only as afterburning lances) arranged in the lid of the heating part 9 (2×5 combined burners/lances 10 above each scrap conveying belt 8).

Important process variables for the process course in the heating part 9 and in the preheating shaft 5 are given in the following table:

| | Process variable (input)output | Unit | Heating part 9 | Preheating shaft 5 |
|---|---|---|---|---|
| 1. | Scrap parameters | | | |
| | flow rate* | t/min | about 4.6 | about 4.6 |
| | amount | t | about 11.9 | about 21.3 |
| | retention time | min | about 2.6 | about 4.7 |
| | temperature | ° C. | 25/327 | 327/834 |
| | oxidation | % | 0.31 | 1.70 |
| 2. | Offgas parameters | | | |
| | flow rate | Nm³/min | 672/1111 | 522**/672 |
| | temperature | ° C. | 829/812 | 1571**/829 |
| | degree of afterburning (total CO-H$_2$) | % | 66.0/97.6 | 38.5**/66.0 |
| | dust content | g/Nm³ | about 49.0 | about 76.4 |
| 3. | Metallic yield*** | % | 99.8 | 101.2 |

*incl. nonmetallic components
**partial amount from the furnace vessel 1
***(t met. product/t met. charge) × 100

* incl. nonmetallic components
** partial amount from the furnace vessel 1
*** (t met.product/t met. charge)×100

Continuous melting of the scrap 7 preheated in the heating part 9 and in the preheating shaft 5 is carried out in the furnace vessel 1, with the thus-forming metal melt 24 being at the same time carburized and partially refined to a melt poor in Si but rich in C and having the properties

| | |
|---|---|
| 1.86% C | about 1550° C. |
| 0.20% Mn | |
| ≦0.05% Si | liquidus temperature about 1400° C. |
| 0.032% S | |
| 0.005% P | | in the furnace vessel 1, before it overflows into the converter vessel 3 via the weir 34. The metal melt 24 within the firnace vessel 1 always has roughly the above-recited properties.

The melting and refining process within the furnace vessel 1 proceeds continuously and is carried out in a quasi-stationary manner with very intensive mixing of the bath while continuously feeding the following substances, media and energies and under the following process conditions:

about 4.61 t/min preheated scrap 7 with a temperature of about 834° C., liquid, FeO$_n$-rich, highly basic (CaO/SiO$_2$=3.55) and hot converter slag 25 with a temperature of about 1620° C., which from the converter vessel 3 counter to the direction of the metal flow flows into the furnace vessel 1 via the weir 34, lime 14 (about 60% thereof in the form of blowing lime via the lime nozzles 35 and about 40% thereof in the form of lump lime via the charging openings 11 arranged in the lid 4 of the furnace vessel 1, the ratio blowing lime/lump lime can be modified as desired), charging coal (lump coal) 13 via the charging openings 11 provided in the lid 4 of the furnace vessel 1, blowing coal (fine coal) 13 via the manipulator lances 32 and 23 as well as via the coal sub-bath nozzles 33 of the furnace vessel 1, natural gas 29 and gaseous oxygen 27 via the burners 32a of the furnace vessel 1, $N_2$ 30 and natural gas 29 via the inert-gas bottom nozzles 33 of the furnace vessel 1, gaseous oxygen 27 via the manipulator lances 32 and/or 23 of the furnace vessel 1, gaseous oxygen 27 via the afterburning lances 35 arranged in the lid 4 of the furnace vessel 1, converter offgas 19 incl. dust in the converter offgas, streaming into the furnace vessel 1 directly from the converter vessel 3, false air, which is sucked into the furnace vessel 1 from the external surroundings, predominantly through the slag door 22 but also via openings for the electrodes arranged in the lid 4, as a result of the negative pressure prevailing in the furnace vessel 1, blowing air 28 as conveying gas via the lances/nozzles 35, 32, 23 and 33, about 53.1 MW continuous electric energy input via the electrodes 16 to satisfy the energy demand in the furnace vessel 1, which input at the overall plant productivity of about 4.87 t crude steel/min (about 292 t crude steel/operating hour) corresponds to an electric energy consumption of about 181.6 kWh/t crude steel.

The products of the furnace vessel 1 are likewise withdrawn continuously and in a semi-stationary manner, namely:

about 4.46 t/min pre-melt 24 rich in C and low in Si and having the above-recited properties, via the weir 34 in the direction of the converter vessel 3, about 416 kg/min slag 25 having the following properties:

| | |
|---|---|
| about 12.2% $FeO_n$ | 0.46% $P_2O_5$ |
| about 5.0% $Fe_{met}$ | 0.21% S |
| 40.9% CaO | basicity ($CaO/SiO_2$) = 2.0 |
| 7.8% MgO | temperature ~ 1550° C. |
| 5.8% MnO | |
| 20.4% $SiO_2$ | |
| 7.0% $Al_2O_3$ | | which leaves the plant continuously via the decanting part 2 through the slag door 22, about 522 $Nm^3$/min offgas 19 and about 79.1 kg/min dust in the offgas having the following properties

| Offgas (gaseous phase) | Offgas (dust) |
|---|---|
| 37.0 vol. % CO | 72.5% $FeO_n$ |
| 23.1 vol. % $CO_2$ | 9.0% CaO |
| 3.3 vol. % $H_2$ | 3.4% $SiO_2$ |
| 8.4 vol. % $H_2O$ | 4.8% C |
| 25.8 vol. % $N_2$ | 5.7% ZnO |
| 1.7 vol. % $O_2$ | balance = MgO + MnO + $Al_2O_3$ + |
| balance = Ar + $SO_2$ + $F_2$ | $SnO_2$ + $P_2O_5$ | total afterburning degree 43.9% temperature ~1570° C. which pass from the furnace vessel 1 into the scrap preheating shaft 5.

After overflowing the weir 34, the pre-melt rich in C and low in Si passes into the converter vessel 3 continuously and at very intensive movement of the bath mixes with the crude steel melt 24 which is always present in the converter vessel 3 and whose properties are continuously controlled within close tolerances:

amount: about 90 t, level of the metal bath in the converter vessel 3: about 0.5 m below the level of the weir 34, composition (particularly the C content) and temperature equal to the tapping values desired for the crude steel, in the present case as follows:

C=0.05%

T=1620° C.

Within the converter vessel 3, above the crude steel melt 24, there collects the liquid converter slag 25, whose surface at a height of the slag layer within the converter vessel 3 of about 1.8–2.0 m is up to 0.5–1.0 m higher than that within the furnace vessel 1 and which, hence, driven by gravity and by impulses from the movement of the bath inside the converter vessel 3, overflows continuously into the furnace vessel 1 via the weir 34.

For the process control in the converter vessel 3 there hence results the following task, which is accomplished continuously/uninterrupted:

refining and heating the high-C, low-Si pre-melt flowing in from the furnace vessel 1 to the properties desired for the crude steel 24 when tapping the same from the converter vessel 3 via the crude steel tapping opening 41 and at the same time mixing this partial stream of the metal melt with the metal bath 24 always present in the converter vessel 3, i.e. homogenization in the converter vessel 3 of the crude steel melt 24 which flows out or is tapped via the tap opening 41, carrying off the converter slag 25 and converter offgases 19 arising continuously during the operation of the converter toward the furnace vessel 1 and adjusting conditions with respect to the quantity, composition and temperature of the crude steel melt 24, slag 25 and offgases 19 in the converter vessel 3, which remain roughly constant in the course of time and which are adjusted to the required properties and the desired tapping velocity of the crude steel 24 via the tap opening 41 (i.e. to the desired plant productivity) and, again, are controlled within certain boundaries by the crude steel tapping velocity and the refining velocity in the converter vessel 3.

In the case under consideration, the refining process in the converter vessel 3 is conducted with very intensive mixing of the bath, in a quasi-stationary manner with continuous feeding of the following substances, media and energies and under the following process conditions:

about 4.46 t/min high-C, low-Si pre-melt from the furnace vessel 1, with the above-mentioned properties, about 0.59 t/min fine scrap 12 as a cooling agent via the charging openings 39 arranged in the converter lid 37, with the composition of the fine scrap 12 corresponding roughly to the composition of the mixed scrap as set forth in Table I and the max. piece length ≦amounting to 100 mm, lump lime 14, quartzite and lump coal 13 likewise via the charging openings 39 in the converter lid 37, gaseous oxygen 27 via the water-cooled converter lance 35', gaseous oxygen 27 via the afterburning lances 35 and $N_2$ 30 and natural gas 29 via the bottom flushing nozzles 36 of the converter vessel 3

The products of the converter vessel 3 are likewise withdrawn continuously and in a semi-stationary manner, namely:

about 4.87 t/min (=about 292 t/h) crude steel 24 with the properties

| | |
|---|---|
| 0.05% C | about 620 ppm O dissolved |
| 0.14% Mn | about 30 ppm N |
| traces of Si | $\leq$ 1.5 ppm H |
| 0.026% S | |
| 0.0038% P | T = 1620° C. |
| 0.21% Cu | | via the tap opening 41 in the converter vessel 3, FeO$_n$-rich, highly basic, liquid converter slag 25 having the properties

| | |
|---|---|
| about 25.0% FeO$_n$ | 0.27% P$_2$O$_5$ |
| about 5.0% Fe$_{met}$ | 0.21% S |
| 42.0% CaO | basicity (CaO/SiO$_2$) = 3.55 |
| 7.9% MgO | temperature ~ 1620° C. |
| 4.8% MnO | |
| 11.8% SiO$_2$ | |
| 2.9% Al$_2$O$_3$ | | via the weir 34 in the direction towards the furnace vessel 1 and converter offgas 19 incl. dust in the converter offgas, with the following properties:

| Offgas (gaseous phase) | Offgas (dust) |
|---|---|
| 84.0 vol. % CO | 91.2% FeO$_n$ |
| 9.3 vol. % CO$_2$ | 3.5% CaO |
| 3.0 vol. % H$_2$ | 0.7% SiO$_2$ |
| 1.4 vol. % H$_2$O | 0.8% C |
| 0.6 vol. % N$_2$ | 1.7% ZnO |
| 1.2 vol. % O$_2$ | balance = MgO + MnO + Al$_2$O$_3$ + |
| balance = Ar + SO$_2$ + F$_2$ | SnO$_2$ + P$_2$O$_5$ | total afterburning degree 11.0% temperature ~1620° C. which from the converter vessel 3 pass directly into the furnace vessel 1.

Important process variables for the process course in the furnace vessel 1 and in the converter vessel 3 are given in the following Table:

| | Process variable (input/output) | Unit | Furnace vessel 1 | Converter vessel 3 |
|---|---|---|---|---|
| 1. | Flow rate | | | |
| | metal | t/min | 4.61/4.46 | 4.46/4.87 |
| | slag | kg/min | 416 | |
| | offgas | Nm$^3$/min | 522 | |
| 2. | Amount | | | |
| | metal | t | about 90 | about 90 |
| | slag | t | about 10 | about 15 |
| 3. | Retention time | | | |
| | metal | min | about 20.2 | about 18.5 |
| | slag | min | about 24 | about 119 |
| 4. | Temperature | | | |
| | metal | ° C. | 834/1550 | 1550/1620 |
| | slag | ° C. | 1620/1550 | –/1620 |
| | offgas | ° C. | 1620/1570 | –/1620 |
| 5. | Slag parameters | | | |
| | FeO$_n$-content | % | about 25.0/about 12.2 | –/about 25.0 |
| | basicity (CaO/SiO$_2$) | — | 3.55/2.0 | –/3.55 |
| 6. | Offgas parameters | | | |
| | degree of afterburning (total CO + H$_2$) | % | 43.9 | 11.0 |
| | dust content | g/Nm$^3$ | about 152 | |
| 7. | Metallic yield* | % | 96.8 | 96.4 |
| 8. | Decarburization velocity | % C/min | 0.070 | 0.110 |

* (t met.product/t met.charge)×100

Exemplary Embodiment 2

The charge mix consists of
- 40% steel scrap
- 30% sponge iron (pellets) and
- 30% liquid pig iron having the properties presented in Table II.

In the instant case, there is principally no essential difference compared with the Exemplary embodiment 1 presented above as far as the plant configuration and the fundamental process course to be employed are concerned. Differences with respect to plant configuration and process control result from the different quantitative ratios and properties of the components in the charge mix. The process is likewise carried out using the plant variant according to FIG. 1, yet employing the scrap preheating shaft 5 having the small effective cross-section of about 5 m$^2$, wherein the difference with respect to the scrap preheating shaft 5 having the large effective cross-section of about 11.5 m$^2$ is made up for by providing an additional lid piece in the lid 4 of the furnace vessel 1, which piece matches the preheating shaft 5 having the smaller effective cross-section. The additional lid piece (not illustrated) is configured identically with the lid 4 of the furnace vessel 1 and in the case of using the shaft 5 of small effective cross-section is firmly interlocked with the same, so that a gas-tight unit is formed, as well as employing only one of the two scrap conveying belts 8 for transporting, preheating (within the framework of the same heating part 9 already described) and charging the scrap 7 into the scrap preheating shaft 5 that has the small effective cross-section, i.e. is active, wherein in the heating part 9 only that half of the, in all, ten natural gas/oxygen/air combination burners/lances 10 are operated which are located above the active scrap conveying belt 8, while the second half of the heating part 9 (behind the refractory dam already mentioned) and the second scrap conveying belt 8 remain passive, i.e. are not being operated.

Further differences compared with the Exemplary embodiment 1 lie in the fact that in the present case there is continuous supply into the furnace vessel 1 of liquid pig iron 20 via the pig iron chute 21 and of sponge-iron pellets 12 via the charging openings 11. Sponge-iron pellets 12 are charged to the converter vessel 3 as a cooling agent, namely in an amount of about 8.8% of the charge mix, i.e. about 29.3% of the sponge-iron pellets comprised in the charge mix, whose total portion in the charge mix is 30%.

The total amount of the scrap in the charge mix is charged onto the scrap conveying belt 8 by means of scrap charging cranes and after preheating in the heating part 9 and in the preheating shaft 5 is continuously supplied into or molten in the furnace vessel 1. The mean height of the scrap column 7 in the preheating shaft 5 is 2.5 m. As the heat source for preheating of the scrap 7 in the heating part 9 and in the preheating shaft 5 there serve the physical and the chemical heat, partial afterburning of the offgases 19 from the furnace vessel 1 and heat from a partial oxidation of the scrap during preheating.

The partial afterburning of the offgases 19 in the preheating shaft 5 is carried out in two steps, with cold air 28 and gaseous oxygen 27 being blown in continuously through the eight afterburning nozzles 47 arranged in two planes, in a ratio of volumes of about air/$O_2$~3.7. In the heating part 9 preheating is carried out stepwise, along the one half that has the active scrap conveying belt 8, by continuous blowing in of cold air 28 and gaseous oxygen 27 via the—in all—five combined burners/lances 10 arranged in the lid of the heating part 9, which are disposed above the active scrap conveying belt 8.

Important process variables for the process course in the heating part 9 and in the preheating shaft 5 are given in the following table:

| Process variables (input/output) | Unit | Heating part 9 | Preheating shaft 5 |
| --- | --- | --- | --- |
| 1. Scrap parameters | | | |
| flow rate* | t/min | 2.1 | 2.2 |
| amount | t | about 5.94 | about 9.41 |
| retention time | min | about 2.8 | about 4.4 |
| temperature | ° C. | 25/379 | 379/1057 |
| oxidation | % | 0.47 | 2.42 |
| 2. Offgas parameters | | | |
| flow rate | Nm³/min | 574/760 | 452**/574 |
| temperature | ° C. | 1302/1086 | 1571**/1302 |
| degree of afterburning (total CO + $H_2$) | % | 68.3/88.1 | 38.5**/68.3 |
| dust content | g/Nm³ | about 46.5 | about 48.3 |
| 3. Metallic yield*** | % | 99.6 | 103.3 |

\* incl. nonmetallic components
\*\* partial amount from the furnace vessel 1
\*\*\* (t met.product/t met.charge)×100

Continuous melting of the scrap 7 preheated in the heating part 9 and in the preheating shaft 5 is carried out in the furnace vessel 1 while likewise continuously feeding the liquid pig iron 20 via the pig iron chute 21 and about 70.7% of the sponge-iron pellets 12 comprised in the charge mix via the charging openings 11. The forming metal melt 24 is at the same time carburized to a low-Si, high-C melt and partially refined in the furnace vessel 1. The metal melt prior to overflowing into the converter vessel 3 via the weir 34 exhibits the following properties:

| | |
| --- | --- |
| 1.69% C | about 1550 ° C. |
| 0.14% Mn | liquidus temperature about 1413° C. |
| ≦0.05% Si | |
| 0.025% S | |
| 0.008% P | |

The metal melt 24 in the furnace vessel 1 has roughly the above-mentioned properties throughout the entire process.

The melting and refining process in the furnace vessel 1 is conducted continuously and at very intensive mixing of the bath in a quasi-stationary manner while continuously feeding the following substances, media and energies and under the following process conditions:

about 2.19 t/min preheated scrap 7 with a temperature of about 1057° C. via the shaft 5, about 1.60 t/min liquid pig iron 20 having properties in accordance with Table II via the pig iron chute 21, 1.13 t/min sponge-iron pellets 12 having properties as set forth in Table II via the charging openings 11, $FeO_n$-rich, highly basic (CaO/$SiO_2$=3.55), liquid and hot converter slag 25 with a temperature of about 1620° C., which from the converter vessel 3 counter to the direction of metal flow flows into the firnace vessel 1 via the weir 34, lime 14 (about 60% thereof in the form of blowing lime via the lime nozzles 35 and about 40% thereof in the form of lump lime via the charging openings 11 provided in the lid 4 of the furnace vessel 1, the blowing lime/lump lime ratio can be modified as desired), blowing coal (fine coal) 13 via a manipulator lance 32 or 33 as well as via the coal sub-bath nozzles 33 in the furnace vessel 1, natural gas 29 and gaseous oxygen 27 via three burners 32a of the furnace vessel 1, $N_2$ 30 and natural gas 29 via the inert-gas bottom nozzles 33 of the furnace vessel 1, gaseous oxygen 27 via the manipulator lances 32 and/or 23 of the furnace vessel 1, gaseous oxygen 27 via the afterburning lances 35 in the lid 4 of the furnace vessel 1, converter offgas 19 incl. dust in the converter offgas, which from the converter vessel 3 flow directly into the furnace vessel 1, false air (not illustrated in FIG. 1), which is sucked into the furnace vessel 1 predominantly through the slag door 22 but also via the openings for the electrodes in the lid 4 from the external surroundings as a consequence of the negative pressure prevailing in the furnace vessel 1, blowing air 28 as conveying gas via the lances/nozzles 35, 32, 23 and 33 and about 53.2 MW continuous electric energy input via the electrodes 16 for covering the heat demand in the furnace vessel 1, which input in the present case at the overall plant productivity of about 4.94 t crude steel/min (about 296 t crude steel/operating hour) corresponds to an electric energy consumption of about 179.6 kWh/t crude steel.

The products of the furnace vessel 1 are likewise withdrawn continuously and in a semi-stationary manner, namely:

about 4.67 t/min high-C, low-Si pre-melt 24 with the above recited properties via the weir 34 in the direction of the converter vessel 3, about 428 kg/min slag 25 having the following properties

| | |
|---|---|
| about 12.4% FeO | 0.87% $P_2O_5$ |
| about 5.0% $Fe_{met}$ | 0.16% S |
| 42.1% CaO | basicity ($CaO/SiO_2$) = 2.0 |
| 7.3% MgO | temperature ~ 1550° C., |
| 4.4% MnO | |
| 21.0% $SiO_2$ | |
| 6.8% $Al_2O_3$ | | which exits the plant continuously via the decanting part 2 through the slag door 22, about 452 $Nm^3$/min offgas 19 and about 79.8 kg/min dust in the offgas having the following properties

| Offgas (gaseous phase) | Offgas (dust) |
|---|---|
| 40.7 vol. % CO | 79.7% $FeO_n$ |
| 25.5 vol. % $CO_2$ | 9.4% CaO |
| 1.4 vol. % $H_2$ | 3.5% $SiO_2$ |
| 3.6 vol. % $H_2O$ | 1.4% C |
| 26.5 vol. % $N_2$ | 2.0% ZnO |
| 1.7 vol. % $O_2$ | balance = MgO + MnO + $Al_2O_3$ + $SnO_2$ + $P_2O_5$ |
| balance = Ar + $SO_2$ + $F_2$ | | total degree of afterburning 40.9% temperature ~1570° C., which from the furnace vessel 1 pass into the scrap preheating shaft 5.

After overflowing the weir 34, the pre-melt 24 rich in C and poor in Si passes into the converter vessel 3 continuously and at a mean velocity of 4.67 t/min and mixes at very intensive movement of the bath with the crude steel melt 24 which is always present in the converter vessel 3 and whose properties are continuously controlled within close tolerances:

amount: about 90 t, level of the metal bath within the converter vessel 3: about 0.5 m below the level of the weir 34, composition (in particular the content of C) and temperature equal to the tapping values desired for the crude steel, in the present case as follows:

C=0.05%

T=1620° C.

Above the crude steel melt 24 inside the converter vessel 3 there collects the liquid converter slag 25, whose surface in the case of a slag layer height in the converter vessel 3 of about 1.8–2.0 m is located up to 0.5–1.0 m higher than in the furnace vessel 1 and which consequently, driven by gravity and impulses from the movement of the bath in the converter vessel 3, overflows into the furnace vessel 1 continuously via the weir 34.

In the instant case, the task to be accomplished by the continuous process control in the converter vessel 3 is the same as with the Exemplary embodiment 1.

The refining process takes place within the converter vessel 3 in a quasi-stationary manner at very intensive mixing of the bath while continuously feeding the following substances, media and energies and under the following process conditions:

about 4.67 t/min pre-melt 24 high in C and low in Si and with the above-mentioned properties from the furnace vessel 1, about 0.47 t/min sponge-iron pellets 12 as the cooling agent via the charging openings 39 of the converter lid 37, the properties of the sponge-iron pellets 12 being presented in Table II, lump lime 14, quartzite and lump coal 13 likewise through the charging openings 39 of the converter lid 37, gaseous oxygen 27 via the water-cooled converter lance 35', gaseous oxygen 27 via the afterburning lance 35 and nitrogen 30 and natural gas 29 via the bottom flushing nozzles 36 of the converter vessel 3.

The products of the converter vessel 3 are likewise carried off continuously and in a semi-stationary manner, namely about 4.94 t/min (=about 296 t/h) crude steel 24 with the properties

| | |
|---|---|
| 0.05% C | about 620 ppm O dissolved |
| 0.08% Mn | about 30 ppm N |
| traces of Si | ≤ 1.5 ppm H |
| 0.022% S | |
| 0.0038% P | T = 1620° C. |
| 0.08% Cn | | via the tap opening 41 of the converter vessel 3, highly basic, liquid converter slag 25 rich in $FeO_n$ and having the properties

| | |
|---|---|
| about 25.0% FeO | 0.28% $P_2O_5$ |
| about 5.0% $Fe_{met}$ | 0.145% S |
| 41.9% CaO | |
| 8.4% MgO | basicity ($CaO/SiO_2$) = 3.55 |
| 2.6% MnO | temperature ~ 1620° C. |
| 11.8% $SiO_2$ | |
| 4.8% $Al_2O_3$ | | via the weir 34 in the direction of the furnace vessel 1 and converter offgas 19 incl. dust of the converter offgas having the following properties

| Offgas (gaseous phase) | Offgas (dust) |
|---|---|
| 84.8 vol. % CO | 93.1% $FeO_n$ |
| 9.4 vol. % $CO_2$ | 3.5% CaO |
| 2.3 vol. % $H_2$ | 0.7% $SiO_2$ |
| 1.1 vol. % $H_2O$ | 0.7% C |
| 0.5 vol. % $N_2$ | 0.3% ZnO |
| 1.3 vol. % $O_2$ | balance = MgO + MnO + $Al_2O_3$ + $SnO_2$ + $P_2O_5$ |
| balance = Ar + $SO_2$ + $F_2$ | | total degree of afterburning 10.8% temperature ~1620° C., which from the converter vessel 3 pass directly into the furnace vessel 1.

Important process variables for the process course in the furnace vessel 1 and in the converter vessel 3 are given in the following table:

| Process variable (input/output) | unit | furnace vessel 1 | converter vessel 3 |
|---|---|---|---|
| 1. Flow rate | | | |
| metal | t/min | 2.19*/4.67 | 4.67/4.94 |
| slag | kg/min | 428 | |
| offgas | Nm³/min | 452 | |
| 2. Amount | | | |
| metal | t | about 90 | about 90 |
| slag | t | about 10 | about 15 |
| 3. Retention time | | | |
| metal | min | about 19.3 | about 18.2 |
| slag | min | about 23.4 | about 117 |
| 4. Temperature | | | |
| metal | °C | 1057*/1550 | 1550/1620 |
| slag | °C | 1620/1550 | –/1620 |
| offgas | °C | 1620/1570 | –/1620 |
| 5. Slag parameters | | | |
| FeO$_n$-content | % | 25.0/12.4 | –/25.0 |
| basicity (CaO/SiO$_2$) | — | 3.55/2.0 | –/3.55 |
| 6. Offgas parameters | | | |
| degree of afterburning (total CO + H$_2$) | % | 40.9 | 10.8 |
| dust content | g/Nm³ | about 176 | |
| 7. Metallic yield** | % | 95.2 | 96.1 |
| 8. Decarburization velocity | % C/min | 0.065 | 0.110 |

\* values for the preheated scrap
\*\* (t met.product/t met.charge)×100

Exemplary Embodiment 3

The charge mix consists of
50% sponge-iron pellets and
50% liquid pig iron
having the properties given in Table II. In this case, the plant variant according to FIGS. 3 and 4 serves for carrying out the process. Due to the fact that no scrap is contained in the charge mix, neither a heating part 9 nor a preheating shaft are needed. The fundamental process course is very similar to that of Exemplary embodiment 2; differences with respect to plant configuration and process control mainly concern the furnace vessel 1, provided that in the present case the scrap preheating shaft 5 is replaced with a conventional water-cooled furnace elbow as the connection piece between the furnace vessel 1 and a hot gas duct (not illustrated in FIG. 3), as is now customary with all conventional electric arc furnaces, the five natural gas/oxygen burners 32a in the furnace vessel 1 are not operated as burners and are protected from damages either by being kept clear by means of air until they are needed again or are optionally (not, however, in the present case) used as additional afterburning nozzles 32a in addition to the afterburning lances 35 already provided in the lid 4 of the furnace vessel 1, and provided that in terms of offgas characteristics (temperature, degree of afterburning, dust content etc.) there is no essential difference between this plant and process variant and the conventional electric arc furnace, i.e., that the physical and chemical heat of the offgases 19 from the furnace vessel 1 remains largely unutilized and the dust content in the offgas 19 is comparable to that of the conventional electric arc furnace.

In the present case, about 24% of the sponge-iron pellets 12 comprised in the charge mix, i.e. about 12% of the total charge mix, are charged into the converter vessel 3 continuously as a cooling agent. The residual amount (principal amount) of the components of the charge-mix is likewise charged to the furnace vessel 1 continuously, namely the liquid pig iron 20 via the pig iron chute 21 and
about 76% of the sponge-iron pellets 12 comprised in the charge mix via the charging openings 11.

The metal melt 24 which forms under supply of electric energy in the furnace vessel 1 is at the same time carburized (with very limited supply of coal) to a low-Si and high-C melt and partially refined, so that prior to overflowing into the converter vessel 3 via the weir 34 that melt has the following properties:

| | | | |
|---|---|---|---|
| 1.98% | C | about 1550° C. | |
| 0.10% | Mn | liquidus temperature about 1394° C. | |
| ≤0.05% | Si | | |
| 0.023% | S | | |
| 0.009% | P | | |

The metal melt 24 in the furnace vessel 1 has roughly the above-listed properties throughout the entire process.

The melting and refining process in the furnace vessel 1 proceeds continuously and is carried out at very intensive mixing of the bath in a quasi-stationary manner under continuous supply of the following substances, media and energies and under the following process conditions:

about 2.56 t/min liquid pig iron 20 having properties in accordance with Table II, via the pig iron chute 21, about 1.94 t/min sponge-iron pellets 12 having properties in accordance with Table II, via the charging openings 11, liquid, FeO$_n$-rich, highly basic (CaO/SiO$_2$=3.53) and hot converter slag 25 with a temperature of about 1620° C., which from the converter vessel 3 flows into the furnace vessel 1 via the weir 34, counter to the direction of the metal flow, lime 14 and dolomite 14 (about 60% thereof as blowing lime or blowing dolomite via the lime nozzles 35 and about 40% thereof as lump lime or lump dolomite 14 via the charging openings 11 arranged in the lid 4 of the furnace vessel 1, the ratio blowing material/lump material can be modified as desired), blowing coal (fine coal) 13 via one or several of the manipulator lances 32, 33 and/or the coal sub-bath nozzles 33 of the furnace vessel 1, nitrogen 30 and natural gas 29 via the inert-gas bottom nozzles 33 of the furnace vessel gaseous oxygen 27 via the manipulator lances 32 and 23 of the furnace vessel 1, gaseous oxygen 27 via the afterburning lances 35 arranged in the lid 4 of the furnace vessel 1, converter offgas 19 incl. dust in the converter offgas, which flow into the furnace vessel 1 directly from the converter vessel 3, false air (not illustrated in FIG. 3), which mainly through the slag door 22 but also via the electrode openings provided in the lid 4 is sucked into the furnace vessel 1 from the external surroundings due to the negative pressure that prevails in the furnace vessel 1, blowing air 28 as a conveying gas via the lances/nozzles 35, 32, 23 and 33, about 53.2 MW continuous electric energy input via the electrodes 16 for covering the heat demand in the furnace vessel 1, which input in the present case at the overall plant productivity of about 4.67 t crude steel/min (about 280 t crude steel/operating hour) corresponds to an electric energy consumption of about 190.0 kWh/t crude steel.

The products of the furnace vessel 1 are likewise carried off continuously and in a semi-stationary manner, namely:

about 4.27 t/min high-C, low-Si pre-melt 24 with the above-mentioned properties via the weir 34 into the converter vessel 3, about 415 kg/min slag 25 with the following properties

| | |
|---|---|
| about 12.0% $FeO_n$ | 1.13% $P_2O_5$ |
| about 5.0% $Fe_{met}$ | 0.15% S |
| 43.1% CaO | basicity ($CaO/SiO_2$) = 2.0 |
| 7.2% MgO | temperature ~ 1550° C., |
| 3.1% MnO | |
| 21.5% $SiO_2$ | |
| 6.7% $Al_2O_3$ | | which exits the plant continuously through the slag door 22 via the decanting part 2 and about 500 $Nm^3$/min offgas 19 and about 74.7 kg/min dust in the offgas with the following properties

| Offgas (gaseous phase) | Offgas (dust) |
|---|---|
| 50.9 vol. % CO | 82.2% $FeO_n$ |
| 21.8 vol. % $CO_2$ | 10.0% CaO |
| 1.0 vol. % $H_2$ | 3.7% $SiO_2$ |
| 1.6 vol. % $H_2O$ | 0.7% C |
| 22.8 vol. % $N_2$ | balance = MgO + MnO + $Al_2O_3$ + $P_2O_5$ |
| 1.5 vol. % $O_2$ | |
| balance = Ar + $SO_2$ + $F_2$ | | total degree of afterburning 31.2% temperature ~1545° C., which from the furnace vessel 1 via the furnace elbow pass into the hot gas duct of an offgas treating plant.

After overflowing the weir 34, the high-C, low-Si pre-melt 24 passes into the converter vessel 3 continuously, at a mean velocity of 4.27 t/min, and at very intensive movement of the bath mixes with the crude steel melt 24 which is always present in the converter vessel 3 and whose properties are continuously controlled within close tolerances:

amount: about 90 t, level of the metal bath in the converter vessel 3: about 0.5 m below the level of the weir 34, composition (in particular the content of C) and temperature equal to the tapping values desired for the crude steel, in the present case as follows:

C=0.05%

T=1620° C.

Above the crude steel melt 24 inside the converter vessel 3 there collects the liquid converter slag 25, whose surface in the case of a slag layer height in the converter vessel 3 of about 1.8–2.0 m is located up to 0.5–1.0 m higher than in the furnace vessel 1 and which consequently, driven by gravity and impulses from the movement of the bath in the converter vessel 3, overflows into the furnace vessel 1 continuously via the weir 34.

In this case, too, the task to be accomplished by the continuous process control in the converter vessel 3 is the same as with the Exemplary embodiments 1 and 2.

The refining process is carried out in the converter vessel 3 with very intensive mixing of the bath in a quasi-stationary manner under continuous supply of the following substances, media and energies and under the following process conditions:

about 4.27 t/min high-C, low-Si pre-melt 24 with the above-mentioned properties from the furnace vessel 1, about 0.62 t/min sponge-iron pellets 12 as cooling agent through the charging openings 39 of the converter lid 37, the properties of the sponge-iron pellets 12 being presented in Table II, lump lime 14 and lump coal 13 also via the charging openings 39 of the converter lid 37, gaseous oxygen 27 via the water-cooled converter lance 35, gaseous oxygen 27 via the afterburning lances 35, nitrogen 30 and natural gas 29 via the bottom flushing nozzles 36 of the converter vessel 3.

The products of the converter vessel 3 are likewise withdrawn continuously and in a semi-stationary manner, namely:

about 4.67 t/min (=about 280 t/h) crude steel 24 with the properties

| | |
|---|---|
| 0.05% C | about 620 ppm O dissolved |
| 0.05% Mn | about 30 ppm N |
| traces of Si | $\leq$1.5 ppm H |
| 0.021% S | T = 1620° C. |
| 0.0038% O | | via the tap opening 41 of the converter vessel 3, highly basic, liquid converter slag 25 rich in $FeO_n$ and having the properties

| | |
|---|---|
| about 25.0% $FeO_n$ | 0.30% $P_2O_5$ |
| about 5.0% $Fe_{met}$ | 0.13% S |
| 42.4% CaO | basicity ($CaO/SiO_2$) = 3.53 |
| 7.8% MgO | temperature ~ 1620° C. |
| 1.7% MnO | |
| 12.0% $SiO_2$ | |
| 5.6% $Al_2O_3$ | | via the weir 34 in the direction towards the furnace vessel 1 and converter offgas 19 incl. dust in the converter offgas, with the following properties

| Offgas (gaseous phase) | Offgas (dust) |
|---|---|
| 79.6 vol. % CO | 92.8% $FeO_n$ |
| 14.1 vol. % $CO_2$ | 4.1% CaO |
| 2.1 vol. % $H_2$ | 0.9% $SiO_2$ |
| 1.6 vol. % $H_2O$ | 1.0% C |
| 0.4 vol. % $N_2$ | balance = MgO + MnO + $Al_2O_3$ + $P_2O_5$ |
| 1.6 vol. % $O_2$ | |
| balance = Ar + $SO_2$ + $F_2$ | | total degree of afterburning 16.1% temperature ~1635° C., which from the converter vessel 3 pass directly into the furnace vessel 1.

Important process variables for the process course in the furnace vessel 1 and in the converter vessel 3 are given in the following table:

| Process variables (input/output) | | Unit | Furnace vessel 1 | Converter vessel 3 |
|---|---|---|---|---|
| 1. | Flow rate | | | |
| | metal | t/min | 2.56*/4.27 | 4.27/4.67 |
| | slag | kg/min | 415 | |
| | offgas | Nm$^3$/min | 500 | |
| 2. | Amount | | | |
| | metal | t | about 90 | about 90 |
| | slag | t | about 10 | about 15 |
| 3. | Retention time | | | |
| | metal | min | about 21.1 | 19.3 |
| | slag | min | about 29.8 | about 104 |
| 4. | Temperature | | | |
| | metal | °C. | 1320*/1550 | 1550/1620 |
| | slag | °C. | 1620/1550 | –/1620 |
| | offgas | °C. | 1635/1545 | –/1635 |
| 5. | Slag parameters | | | |
| | FeO$_n$-content | % | 25.0/12.0 | –/25.0 |
| | basicity (CaO/SiO$_2$) | — | 3.53/2.0 | –/3.53 |
| 6. | Offgas parameters | | | |
| | degree of afterburning (total CO + H$_2$) | % | 31.2 | 16.1 |
| | dust content | g/Nm$^3$ | about 150 | |
| 7. | Metallic yield** | % | 94.9 | 95.5 |
| 8. | Decarburization velocity | % C/min | 0.090 | 0.125 |

\* values for liquid pig iron
\*\* (t met.product/t met.charge)x100

Important process parameters for and the productivity achievable in the exemplary embodiments presented above can be seen from Table V, whereas Table VI gives a summery of the consumption figures for the production of 1 t crude steel using the process and plant variants of the invention.

TABLE V

Process parameters and productivity for the Exemplary embodiments 1 to 3

| Exemplary embodiment | No. | 1 | 2 | 3 |
|---|---|---|---|---|
| charge mix | | | | |
| pig iron liquid | wt. % | — | 30 | 50 |
| steel scrap | wt. % | 100 | 40 | — |
| DRI pellets | wt. % | — | 30 | 50 |
| Reference parameters | unit | process parameters and productivity | | |
| minimum required transformer output | MVA | 69.5 | 69.7 | 69.7 |
| process parameter | | | | |
| tap-to-tap time | min | 12.3 | 12.1 | 12.8 |
| power-on-time furnace vessel | min | continuously | continuously | continuously |
| O$_2$ blowing time | min | continuously | continuously | continuously |
| mean refining rate in the furnace vessel | % C/min | 0.070 | 0.065 | 0.090 |
| mean refining rate in the converter vessel | % C/min | 0.110 | 0.110 | 0.125 |
| tapping temperature of the steel | °C. | 1620 | 1620 | 1620 |
| tapping temperature of the slag | °C. | 1550 | 1550 | 1550 |
| offgas temperature at entry into the hot gas duct | °C. | 812 | 1086 | 1545 |
| O$_2$ in the offgas at entry into the hot gas duct | vol. % | 5.1 | 3.8 | 1.5 |
| degree of CO afterburning at entry into the hot gas duct | % | 97.6 | 88.1 | 30.0 |
| degree of CO + H$_2$ afterburning at entry into the hot gas duct | % | 97.6 | 88.6 | 31.1 |
| productivity | | | | |

TABLE V-continued

Process parameters and productivity for the Exemplary embodiments 1 to 3

| Exemplary embodiment | No. | 1 | 2 | 3 |
|---|---|---|---|---|
| net man days per year (exchange vessel) | days/year | 300.0 | 300.0 | 300.0 |
| output per minute | t/min | 4.87 | 4.94 | 4.67 |
| output per hour | t/hour | 292.2 | 296.4 | 280.2 |
| output per day | t/day | 7012.8 | 7113.6 | 6724.8 |
| output per year | t/year | 2103840 | 2134080 | 2017440 |

TABLE VI

Consumption figures for Exemplary embodiments 1 to 3:

| Exemplary embodiment | | No. | 1 | 2 | 3 |
|---|---|---|---|---|---|
| charge mix | | | | | |
| pig iron, liquid | | wt. % | — | 30 | 50 |
| steel scrap | | wt. % | 100 | 40 | — |
| DRI pellets | | wt. % | — | 30 | 50 |
| type of consumption | type | unit | amount consumed, unit/t crude steel | | |
| metallic charging substances | | | | | |
| liquid pig iron | liquid | t | | 0.323 | 0.548 |
| steel scrap (mix) | solid | t | 1.058 | 0.430 | |
| DRI/HBI | pellets | t | | 0.323 | 0.548 |
| nonmetallic charging substances | | | | | |
| lime | lumpy | kg | 29.88 | 33.20 | 36.04 |
| dolomite | lumpy | kg | 0.00 | 0.00 | 0.88 |
| quartzite | lumpy | kg | 0.91 | 0.34 | 0.00 |
| refractories | bricks | kg | 2.95 | 3.00 | 2.97 |
| refractories | gunning material | kg | 0.73 | 0.75 | 0.74 |
| graphite electrodes | graphite | kg | 1.23 | 1.06 | 0.94 |
| media | | | | | |
| $O_2$ (lances + sub-bath nozzles) | gaseous | $Nm^3$ | 31.16 | 28.89 | 39.19 |
| $O_2$ (burners + super-bath nozzles) | gaseous | $Nm^3$ | 21.12 | 16.70 | 7.52 |
| $N_2$ (bottom flushing) | gaseous | $Nm^3$ | 0.31 | 0.28 | 0.26 |
| compressed air | blowing air | $Nm^3$ | 6.92 | 3.31 | 1.94 |
| false air + ventilator air | suction air + blowing air | $Nm^3$ | 163.57 | 98.31 | 28.51 |
| energy sources | | | | | |
| electric energy | | kWh | 181.6 | 179.6 | 190.0 |
| natural gas | | $Nm^3$ | 3.70 | 1.28 | 0.26 |
| charging coal | lumpy | kg | 12.32 | 3.70 | 5.20 |
| blowing coal | fine-grained | kg | 20.53 | 8.40 | 4.28 |
| measurements, samples | | | | | |
| temperature probes | | pcs. | 0.017 | 0.017 | 0.017 |
| sampling probes (metal) | | pcs. | 0.033 | 0.033 | 0.033 |
| CELOS probes (aO, T) | | pcs. | 0.017 | 0.017 | 0.017 |
| operating personnel | | man year | 16.0 | 16.0 | 16.0 |
| products | | | | | |
| crude steel | | t | 1.000 | 1.000 | 1.000 |
| slag | | kg | 85.47 | 86.65 | 88.84 |
| offgas | condensed substances | kg | 11.18 | 10.22 | 16.00 |
| offgas | gases | $Nm^3$ | 228.08 | 153.90 | 106.98 |

Apart from the production of crude steel, the plant concept which has been set forth, namely the variant without a preheating shaft 5 and without a heating part 9, can also be used for pretreating metal melts with or without an iron content, wherein, in special cases, it would even be conceivable to operate with negative pressure (f.i. as low as 0.1 bar residual pressure in the whole vessel).

Exemplary embodiment 4

Pretreatment of liquid pig iron, namely desiliconization, dephosphorization and desulphurization, which according to the invention proceeds as follows:

continuous feeding of liquid pig iron (f.i. directly from the hot metal chute of a blast furnace or a melt reduction plant or from an intermediate vessel) having the following properties:

| T = 1440° C. (blast furnace) | 4.3% C |
| --- | --- |
| | 0.6% Si |
| | 0.5% Mn |
| | 0.100% P |
| | 0.040% S | continuous prefining and optionally preheating by means of electric energy in the furnace vessel 1 with production of a low-Si intermediate product having the properties

| 4.0–4.1% C | T 1300–1400° C. |
| --- | --- |
| ≦0.10% Si | (adjustable as required) |
| 0.4–0.5% Mn | |
| 0.060–0.080% P | |
| 0.030–0.035% S | | continuous final refining of the low-Si intermediate product in the converter vessel 3 and, if necessary, heating (through partial decarburization) to pretreated pig iron with the properties

| 3.5–4.0% C | T = 1350–1400° C. |
| --- | --- |
| ≦0.05% Si | |
| 0.3–0.4% Mn | |
| ≦0.020% P | |
| ≦0.025% S | |

The pig iron so pre-treated is tapped off from the converter vessel 3 continuously (f i. into a subsequently connected intermediate vessel) or discontinuously into an intermediate vessel or into pig iron ladles) and later-on is charged either to a converter or to an electric arc furnace or is cast into pigs at a casting machine.

During the process course there are continuously supplied both into the furnace vessel 1 and into the converter vessel 3 oxygen in the form of gaseous oxygen (lances, nozzles) and/or oxygen in the form of Fe ore, Mn ore, scales, dried $FeO_n$-rich sludge etc. via lances, nozzles or via charging chutes and slagformers (lime, fluorspar etc.), preferably in the form of lumps and optionally carbon carriers (coal, coke, etc.) as well as inert gas ($N_2$) as bottom flushing agent, so that the process parameters, such as temperature control, slag control (basicity about 3.0–3.5 in the converter vessel 3 about 1.8–2 in the furnace vessel 1), mixing of the bath and quantitative ratios metal/slag, that are necessary for achieving the desired results can be adjusted in the converter vessel and in the furnace vessel.

Since the demand for electric energy in the exemplary embodiment set forth above is low (5–10 kWh/t pig iron) at an equal temperature of the pre-treated pig iron being charged, only a weak transformer of 20 MVA is provided for the furnace vessel 1 at a plant productivity of 10 t/min liquid pig iron (=600 t/h). In most cases encountered in actual practice (pig iron with P≦0.200%), the electrodes in the furnace vessel 1 can be omitted.

With appropriate process control, the process course set forth above can also be effectively employed for pretreating special pig iron having a high content of V, Ti, Mn and P. Yet, the process, respectively the plant, is also very well suited to the production of liquid pig iron having a very low content of accompanying elements (Si, Mn, P and S at the same time), i.e. for producing a pig iron melt of the "SOREL-METAL" type from conventional pig iron.

Exemplary Embodiment 5

Further, the application of the process and plant is explained by means of an example for the production of a high-Cr and high-Ni pre-melt for the production of stainless steel by subsequent VOD treatment. The process course in accordance with the invention is as follows:

In a plant according to FIGS. 1 and 2, the solid charging substances 7, consisting of unalloyed and/or alloyed steel scrap FeCrHc, FeMo Ni metal and/or FeNi ore, f.i. chromium, nickel, manganese, molybdenum, etc. ores, by means of the conveyor belt 8 are charged into the preheating shaft 5 or into the electric arc furnace vessel 1 continuously via the heating part 9 and in doing so are preheated. Where liquid charging substances 20, such as f.i.

pig iron, preferably pre-dephosphorized pig iron (% P≦0.025), and/or liquid FeCrHC (from an electric arc furnace or an induction furnace) are employed, such substances are introduced into the electric arc furnace vessel 1 continuously via the charging chute 21.

The melting process in the electric arc furnace vessel 1 is carried out continuously with very intensive mixing of the bath, under the following conditions:

continuous supply of gaseous oxygen 27 and inert gas 30 ($N_2Ar$) via nozzles 33, with the $O_2/N_2/Ar$ ratio being adjustable as desired, continuous supply of gaseous oxygen 27 via lances 23, 32, and continuous supply of slagformers 14, such as burnt lime, burnt dolomite, fluorspar etc.

in lumpy form through the charging openings 11 and/or in fine-grained form via the nozzles 33 and/or lances 23, 32.

The object of the process control in the electric arc furnace vessel 1 is the quasi-stationary adjustment of predetermined process parameters, which in the case of producing a pre-melt for austenitic steel quality 304 are as follows:

the metal melt 24 has properties which remain roughly constant at all times and lie within the tolerances

| | |
|---|---|
| 1.5–2.0% C (depending on the charge mix) | T = 1620–1630° C. |
| ≦0.2% Si | |
| ≦0.5% Mn | |
| 17.0–18.5% Cr | |
| about 6.5% Ni | | liquid slag 25 of a composition remaining roughly constant at all times, f.i. as a standard analysis

| | |
|---|---|
| 48% CaO | balance = MnO, Al₂O₃ etc. |
| 31% SiO₂ | (depending on the charge mix) |
| ≦5% MgO | |
| ≦4% Cr₂O₃ | |
| ≦2% FeO$_n$ | | which leaves the plant continuously through the slag door 22 via the decanting part 2.

During operation, the metal melt 24 possessing the above-listed properties flows continuously from the electric arc firnace vessel 1 via the weir 34 into the converter vessel 3 and at very intensive movement of the bath mixes with the crude steel melt 24 which is always present in the converter vessel 3 and which in the present case constitutes a pre-melt for the next VOD treatment and in the converter vessel 3 is always maintained at the composition and temperature about 0.25% C about 1700–1710° C.

desired for tapping.

The refining process (mainly decarburization) is carried out in the converter vessel 3 under the following process conditions:

continuous feeding of gaseous oxygen 27 and inert gas 30 (N₂Ar) via the nozzles 36, wherein the ratio O₂/N₂/Ar is adjustable as desired; in the present case, the top-lance 35' is not employed, the preferred decarburization rate is 0.03–0.05% C/min, temperature of the metal bath 24 from 1700–1710° C., continuous supply of charge-mix components as cooling and alloying agents 12—Ni and/or FeNi, low-Si FeCrHC and/or FeMnHC etc.

continuous supply of slagformers 14, such as burnt lime, burnt dolomite, fluorspar etc.

preferably in lumpy form via the charging openings 39, optionally also in fine-grained form via the nozzles 36, formation/accumulation of an almost solid slag 25 of a composition which remains roughly constant, f.i. as a standard analysis

| | | |
|---|---|---|
| about 30% CaO | 2–5% Al₂O₃ | ≦5% CaF₂ |
| ≦15% SiO₂ | ≦5% FeO$_n$ | |
| 13–17% Cr₂O₃ | about 10% Fe$_{met}$ | |
| 5–8% MgO | ≦4% Cr$_{met}$ | |

The metal product 24—a pre-melt of the above properties for subsequent VOD treatment—is tapped from the converter vessel 3 via the metal tapping means 41. Tapping of the metal may be continuous or discontinuous without interrupting the process course in the electric arc furnace vessel 1.

The offgases 19 forming in the converter vessel 3 and in the electric arc furnace vessel 1 are concertedly withdrawn via the preheating shaft 5 and the heating part 9 and at the same time are employed for preheating the solid charging substances 7. At the same time, the charge in the preheating shaft 5 acts as pre-filter with respect to the dust content in the offgas 19.

To avoid excessive accumulation of slag 25 in the converter vessel 3 or to avoid skulls being caused thereby, a so-called "washing-out operation" is carried out after about 3 hours of operation in that f.i. slightly higher amounts of FeSi, lime and fluorspar are introduced into the converter vessel 3. This operation renders it possible to liquefy the slag 25 in the converter vessel 3 and at the same time reduce the content of Cr₂O₃, so that the slag 25 can pass into the neighboring electric arc furnace vessel 1 over the weir 34 in countercurrent movement to the metal 24 without difficulty, and that without causing high losses of Cr, before mixing with the slag portion formed in the electric arc furnace vessel 1. The so-called washing-out operation can be carried out without incurring specific expenses and without substantially throttling the productivity, both with the plant being operated with continuous tapping and with discontinuous tapping of the metal 24 from the converter vessel 3.

The process of the invention can also be employed for producing stainless qualities of low C content (≦0.05%), i.e. without a VOD plant. In this case, deoxidation and desulphurization of the steel like in the making of C steel take place during the tapping from the converter vessel 3 and the subsequent secondary metallurgical treatment (f.i. at a ladle furnace or a flushing station).

Essential advantages of the process of the invention as compared to known, discontinuous processes for the production of stainless qualities are:

substantially increased process and plant productivity safeguarding of optimized slag control and high decarburization efficiency savings in terms of reduction silicon, slagformers and energy sources—(C carriers and/or electric energy)

reduction in terms of power consumption

What is claimed is:

1. Plant for the production of metal melts, comprising:

an electric arc furnace vessel (a) provided with at least one charging opening (11, 21) for a metal melt and/or scrap and/or direct reduced metal, and/or ore and at least one electrode (16) as well as at least one slag tapping means (22); and an oxygen-blowing converter provided with at least one metal tapping means, wherein a bath surface in relation to bath volume is smaller in the oxygen-blowing converter vessel (3) than in the electric arc furnace vessel (1), the oxygen-blowing converter vessel (3) has a volume which is axially symmetrical about a vertical axis of the oxygen-blowing converter vessel, and wherein the oxygen-blowing converter vessel shares a common reaction space with the electric arc furnace vessel (1), which space is arranged above the bath level of each vessel, and a flow connection is provided between the electric arc furnace and the oxygen-blowing converter by means of a side wall opening of the electric arc furnace and the converter, said opening being provided at a site where thwe electric arc furnace and the converter form a common side wall, and said opening provides for a combination of the electric arc furnace with the oxygen-blowing converter to form said common reaction space.

2. Plant according to claim 1, characterized in that the unit comprised of the oxygen-blowing converter vessel (3) and the electric arc furnace vessel (1) is rigidly mounted on the foundation.

3. Plant according to claim 1, characterized in that the level of the metal bath of the oxygen-blowing converter vessel (3) is located below the level of the metal bath of the electric arc furnace vessel (1).

4. Plant according to claim 1, characterized in that the bottom of the oxygen-blowing converter vessel (3) is arranged on a lower level than the bottom (18) of the electric arc furnace vessel (1).

5. Plant according to claim 1, characterized in that the oxygen-blowing converter vessel (3) is provided with at least one blowing lance (35, 35') for oxygen or an oxygen-containing gas mixture.

6. Plant according to claim 1, characterized in that the oxygen-blowing converter vessel (3) is provided with bottom nozzles (36).

7. Plant according to claim 1, characterized in that the electric arc furnace vessel (1) is provided with at least one metal tapping means (43).

8. Plant according to claim 1, characterized in that the slag tapping means (22) is provided on a decanting vessel (2) which forms a unit with the electric arc furnace vessel (1).

9. Plant according to claims 1, characterized in that the oxygen-blowing converter vessel (3) and/or the electric arc furnace vessel (1) is/are provided with a charging opening (11, 39) for charging metallic charging substances, ore, fluxes, alloys, carburizing agents.

10. Plant according to claim 1, characterized in that the oxygen-blowing converter vessel (3) and/or the electric arc furnace vessel (1) is/are provided with afterburning nozzles and/or lances (35) feeding an oxygen-containing gas or oxygen.

11. Plant according to claim 1, characterized in that the electric arc furnace vessel (1) is provided with at least one preheating shaft (5) supplying solid iron carriers (7) which is arranged above the electric arc furnace vessel (1).

12. Plant according to claim 11, characterized in that at least one conveyor belt (8) is provided with a casing (6) enters the preheating shaft (5) (FIGS. 1, 5, 7).

13. Plant according to claim 12, characterized in that the casing (6) is entered by heating means (10) mounted in the casing and configured as afterburning means (10) and/or burners having ducts feeding an oxygen-containing gas (FIGS. 1, 7).

14. Plant according to claim 1, characterized in that at least part of the inner surface of the preheating shaft (5) and/or the casing (6) and/or the lid (4) of the electric arc furnace vessel (1) and/or the lid (37) of the oxygen-blowing converter vessel (3) is lined with refractory materials.

15. Plant according to claim 1, characterized in that the electric arc furnace vessel (1) is provided with a means (21) for feeding a metal melt (20).

16. Plant according to claim 11, characterized in that the electric arc furnace vessel (1) is provided with a preheating shaft (5), which is arranged above the electric arc furnace vessel (1) and via a gas-permeable, cooled shut-off device (5") opens into the electric arc furnace vessel (1) (FIGS. 9, 10).

17. Plant according to claim 16, characterized in that the preheating shaft (5) is arranged centrally above the electric arc furnace vessel (1) and the lid (4) of the electric arc furnace vessel (1) is designed to be annular so as to surround the preheating shaft (5) and connect the same with side walls of the electric arc furnace vessel (1), with electrodes (16), preferably graphite electrodes, projecting through the lid (4) into the interior of the electric arc furnace vessel (1) in an oblique manner (FIGS. 9, 10).

18. Plant according to claim 1, characterized in that there are provided nozzles (33) and/or lances (32) and/or burners (32a) opening into the interior of the electric arc furnace vessel (1) and connected either to a supply means for iron carriers and/or an ore supply means and/or a supply means for coal or carbon carriers and/or a supply means for slagformers and/or a supply means supplying oxygen or an oxygen-containing gas and/or a hydrocarbon supply means and/or a supply means for an inert gas.

19. Plant according to claim 1, characterized in that nozzles (36) and/or lances (35) are arranged in the oxygen-blowing converter (3), which are connected either to a supply means for iron-carriers and/or an ore supply means and/or a supply means for coal or carbon carriers and/or a supply means for slagformers and/or a supply means supplying oxygen or an oxygen-containing gas and/or a hydrocarbon supply means and/or a supply means for an inert gas.

20. Plant according to claim 18, characterized in that the nozzles (33, 36) are configured as sub-bath nozzles and/or bottom flushing bricks or the lances (32, 35) are arranged so as to be movable, in particular pivotable and/or displaceable in their longitudinal direction.

21. Plant according to claim 1, characterized in that the electric arc furnace vessel (1) is provided with (one) roughly centrally arranged electrode(s) (16) projecting into the vessel (1) from above.

22. Plant according to claim 11, characterized in that the preheating shaft (5) is configured as a unit separable from the electric arc furnace vessel (1) and from the casing (6).

23. Plant according to claim 1, characterized in that the lid (4) of the electric arc furnace vessel (1) and the lid (37) of the oxygen-blowing converter vessel (3) form a unit or are configured as a unit.

24. Plant according to claim 1, characterized in that there is provided at least one control and/or repair opening (50).

25. Plant according to claim 1, characterized in that the oxygen-blowing converter vessel (3) is constructed as a structural unit separable from the electric arc furnace vessel (1).

26. Plant according to claim 1, characterized in that the electric arc furnace vessel (1) is provided with a bottom (18) downwardly inclined in the direction towards the decanting vessel (2) and merging into a roughly horizontally located bottom part of the decanting vessel (2), with the lowermost point of the bottom being provided in the decanting vessel (2) and a metal tapping means (43) being provided at the lowermost point of the bottom (18) of the decanting vessel (2).

27. Plant according to claim 1, wherein oxygen-blowing converter (3) and the electric arc furnace vessel (1) form a unit which is connected via an overflow weir (34).

28. Plant according to claim 6, wherein said bottom nozzles are oxygen-blowing nozzles.

29. Plant according to claim 8 wherein said decanting vessel is opposite to the overflow weir.

30. Plant according to claim 12, wherein at least one of the afterburning nozzles is in the vicinity of the transition between the two vessels.

31. Plant according to claim 15, wherein said metal melt is liquid pig iron.

32. Plant according to claim 21, wherein said furnace vessel is also provided with a bottom electrode.

33. Plant according to claim 24, wherein said control and/or repair opening is above the transition from the electric arc furnace vessel to the oxygen-blowing converter vessel.

* * * * *